United States Patent
Kimn

(10) Patent No.: US 11,483,280 B2
(45) Date of Patent: Oct. 25, 2022

(54) METHOD OF TRANSLATING IP PACKET FOR TETHERING SERVICE, COMMUNICATION SYSTEM AND ELECTRONIC DEVICE FOR PERFORMING THE SAME

(71) Applicant: Samsung Electronics Co., Ltd., Suwon-si (KR)

(72) Inventor: Soungkwan Kimn, Pyeongtaek-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/906,297

(22) Filed: Jun. 19, 2020

(65) Prior Publication Data

US 2021/0126897 A1    Apr. 29, 2021

(30) Foreign Application Priority Data

Oct. 25, 2019    (KR) .......................... 10-2019-0133517

(51) Int. Cl.
*G06F 15/16* (2006.01)
*H04L 61/251* (2022.01)

(52) U.S. Cl.
CPC ................................. *H04L 61/251* (2013.01)

(58) Field of Classification Search
CPC ............... H04L 61/2514; H04L 61/251; H04L 61/2507; H04L 61/2503; H04L 61/2517
USPC .................... 709/202–203, 245–246
See application file for complete search history.

(56) References Cited

U.S. PATENT DOCUMENTS

| | | | |
|---|---|---|---|
| 6,865,613 B1 * | 3/2005 | Millet | H04L 61/25 709/245 |
| 7,529,852 B2 * | 5/2009 | Satapati | H04L 61/251 709/245 |
| 8,773,990 B1 | 7/2014 | Rasool et al. | |
| 9,226,141 B1 | 12/2015 | Vivanco | |
| 9,462,476 B1 | 10/2016 | Vivanco | |
| 10,237,183 B2 | 3/2019 | Srivastav et al. | |
| 10,749,842 B2 * | 8/2020 | Kim | H04L 61/251 |
| 2003/0225900 A1 * | 12/2003 | Morishige | H04L 61/251 709/230 |

(Continued)

FOREIGN PATENT DOCUMENTS

| | | |
|---|---|---|
| KR | 20170001654 A | 1/2017 |
| KR | 1855310 B1 | 5/2018 |

*Primary Examiner* — Bharat Barot

(74) *Attorney, Agent, or Firm* — Harness, Dickey & Pierce, P.L.C.

(57) ABSTRACT

A method of translating an Internet protocol (IP) packet, the method including forming, by a first electronic device, a forwarding table by assigning a first IP address and a second IP address to a second electronic device, a tethering service being provided to the second electronic device through the first electronic device through an internal network, the first IP address and the second IP address having different formats and being associated in the forwarding table, and performing, by the first electronic device, an IP address translation on a first IP packet to be transmitted based on the forwarding table such that the first IP packet includes the first IP address or the second IP address, the first IP packet being included in a communication between the second electronic device and an external network through the internal network and the first electronic device.

20 Claims, 17 Drawing Sheets

(56) References Cited

U.S. PATENT DOCUMENTS

| | | | |
|---|---|---|---|
| 2004/0184455 A1* | 9/2004 | Lin | H04L 61/25 370/401 |
| 2004/0233916 A1* | 11/2004 | Takeuchi | H04L 61/251 370/466 |
| 2006/0023744 A1* | 2/2006 | Chen | H04L 61/2517 370/466 |
| 2012/0207173 A1* | 8/2012 | Namihira | H04L 61/2514 370/400 |
| 2013/0254264 A1 | 9/2013 | Hankinson et al. | |
| 2013/0346629 A1* | 12/2013 | Wang | H04L 61/2546 709/245 |
| 2014/0211714 A1* | 7/2014 | Li | H04L 61/2517 370/329 |
| 2017/0078243 A1 | 3/2017 | Backman et al. | |
| 2017/0094581 A1* | 3/2017 | Sun | H04L 61/2503 |
| 2017/0208032 A1* | 7/2017 | Cox | H04L 61/2514 |
| 2017/0339727 A1* | 11/2017 | Barrett | H04L 61/2015 |
| 2018/0097729 A1* | 4/2018 | Srivastav | H04L 61/251 |
| 2018/0220325 A1* | 8/2018 | Lee | H04L 47/24 |
| 2019/0007314 A1 | 1/2019 | Kuppannan et al. | |
| 2019/0166090 A1 | 5/2019 | Kim et al. | |

* cited by examiner

METHOD OF TRANSLATING IP PACKET FOR TETHERING SERVICE, COMMUNICATION SYSTEM AND ELECTRONIC DEVICE FOR PERFORMING THE SAME

CROSS-REFERENCE TO RELATED APPLICATION

This application claims priority under 35 USC § 119 to Korean Patent Application No. 10-2019-0133517, filed on Oct. 25, 2019 in the Korean Intellectual Property Office (KIPO), the contents of which are herein incorporated by reference in their entirety.

BACKGROUND

1. Technical Field

Example embodiments relate generally to semiconductor integrated circuits, and more particularly to methods of translating Internet protocol (IP) packets for tethering services, communication systems performing the methods, and electronic devices for performing the methods.

2. Description of the Related Art

With development in information communication technology and semiconductor technology, a variety of electronic devices are advancing into multimedia devices which provide various multimedia services. An electronic device may provide a tethering service which enables another electronic device to use a wireless Internet service. Tethering allows the electronic device having Internet connection functionality to provide the Internet connection service to the other electronic device which lacks an Internet connection. When providing the tethering service, packets based on Internet protocol version 4 (IPv4) protocol have been processed using network address translation (NAT) including port translation.

To overcome the limitations of the IPv4 protocol, Internet protocol version 6 (IPv6) protocol has been proposed, and a communication environment based on the IPv6 protocol is being implemented. Even in the communication environment based on the IPv6 protocol, services using the existing IPv4 protocol may still exist, so packet processing using NAT may still be used. However, use of NAT may result in excessive processing time, address translation time and/or memory usage.

SUMMARY

At least one example embodiment of the present disclosure provides a method of translating an Internet protocol (IP) packet for a tethering service capable of improving or enhancing communication performance without network address translation (NAT).

At least one example embodiment of the present disclosure provides a communication system and an electronic device that perform the method.

According to example embodiments, in a method of translating an Internet protocol (IP) packet, the method including forming, by a first electronic device, a forwarding table by assigning a first IP address and a second IP address to a second electronic device, the first electronic device and the second electronic device being connected through an internal network such that a tethering service is provided to the second electronic device through the first electronic device, the first IP address and the second IP address having different formats, and the first IP address being associated with the second IP address in the forwarding table, and performing, by the first electronic device, an IP address translation on a first IP packet to be transmitted based on the forwarding table such that the first IP packet includes the first IP address or the second IP address, the first IP packet being included in a communication between the second electronic device and an external network through the internal network and the first electronic device.

According to example embodiments, a communication system includes a first electronic device configured to connect to an external server via an external network, and a second electronic device configured to receive a tethering service through the first electronic device via an internal network, wherein the first electronic device is configured to, form a forwarding table by assigning a first IP address and a second IP address to the second electronic device, the first IP address and the second IP address having different formats, and the first IP address being associated with the second IP address in the forwarding table, and perform an IP address translation on a first IP packet to be transmitted based on the forwarding table such that the first IP packet includes the first IP address or the second IP address, the first IP packet being included in a communication between the second electronic device and the external network through the internal network and the first electronic device.

According to example embodiments, an electronic device includes a receiver configured to receive a first Internet Protocol (IP) packet based on communication between an external electronic device and a first network using a tethering service, the first IP packet including a source address, a destination address, a source port and a destination port, processing circuitry configured to, manage a tethering connection state with the external electronic device such that a tethering service is provided to the external electronic device through a second network, obtain a medium access control (MAC) address of the external electronic device and interface information of the second network, generate a first IP address and a second IP address, assign the first IP address and the second IP address to the external electronic device, perform an IP address translation on the first IP packet such that the source address or the destination address is translated into the first IP packet includes the first IP address or the second IP address, the first IP address and the second IP address having different formats, and perform packet processing on the first IP packet based on a forwarding table to obtain a packet-processed first IP packet, the forwarding table including the first IP address, the second IP address and the MAC address of the external electronic device and the interface information of the first network, the first IP address being associated with the second IP address in the forwarding table; a storage configured to store the forwarding table, a transmission queue configured to queue the packet-processed first IP packet to obtain a queued first IP packet, and a transmitter configured to transmit the queued first IP packet, wherein the source port and the destination port of the first IP packet are the same as a source port and a destination port of the queued first IP packet.

In the method of translating the IP packet, the communication system and the electronic device according to example embodiments, the first electronic device which provides the tethering service may form or generate the forwarding table including an IPv4 address and a CLAT IPv6 address of the second electronic device which receives the tethering service, and the first electronic device may perform the IP address translation on the first IP packet transmitted between the second electronic device and the external network based on the forwarding table. In addition, the first IP packet may include one of the IPv4 address and the CLAT IPv6 address of the second electronic device instead of an address of the first electronic device. Accordingly, only the address translation may be performed once based on the forwarding table without the NAT, the processing time and memory usage may be reduced, and the memory efficiency, communication performance and efficiency may be improved or enhanced.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
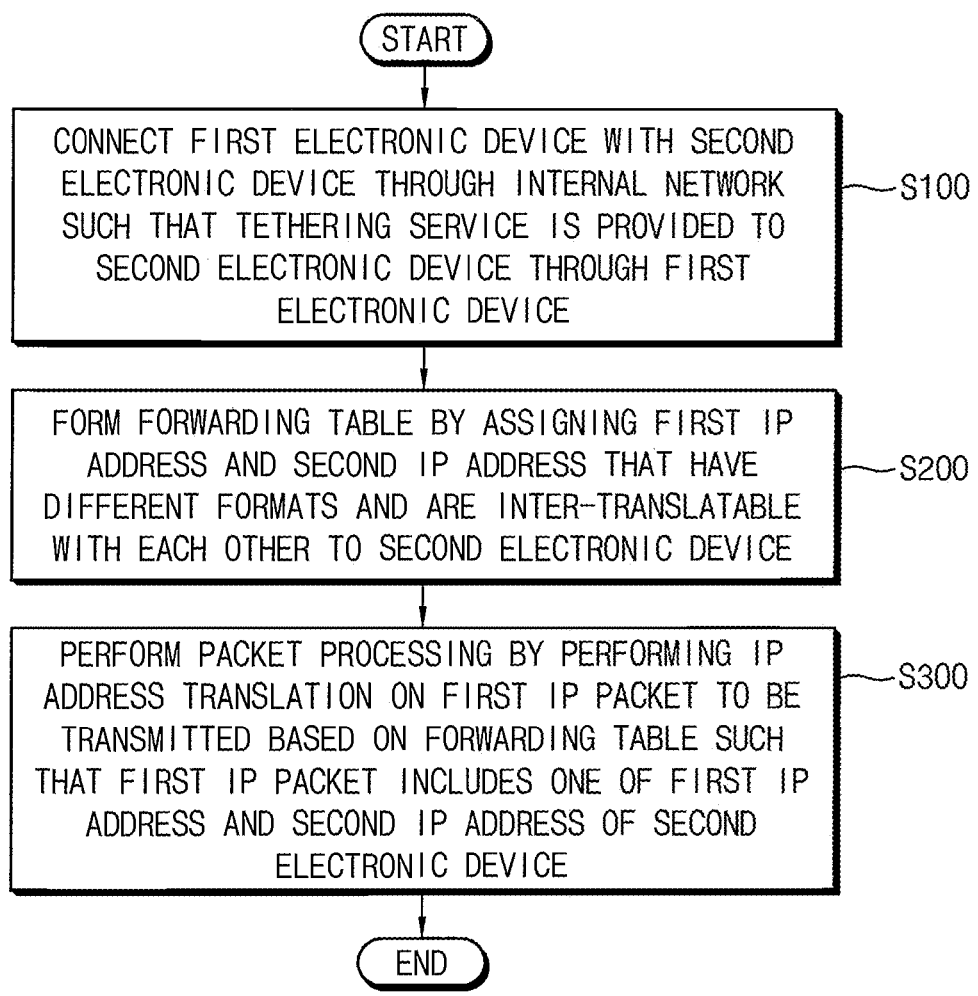
FIG. 1 is a flowchart illustrating a method of translating an Internet protocol (IP) packet for a tethering service according to example embodiments.

Various example embodiments will be described more fully with reference to the accompanying drawings, in which embodiments are shown. The present disclosure may, however, be embodied in many different forms and should not be construed as limited to the examples set forth herein. Like reference numerals refer to like elements throughout this application.

FIG. 1 is a flowchart illustrating a method of translating an Internet protocol (IP) packet for a tethering service according to example embodiments.

Referring to FIG. 1, a method of translating an IP packet for a tethering service according to example embodiments may be performed by a communication system that includes a first electronic device, a second electronic device, an internal network and/or an external network. Configurations of the communication system and the first electronic device included therein will be described with reference to FIGS. 2 through 7.

In the method of translating the IP packet for the tethering service according to example embodiments, the first electronic device and the second electronic device may be connected with each other through the internal network such that the tethering service is provided to the second electronic device through the first electronic device (operation S100).

An electronic device may provide a tethering service which enables another electronic device to use a wireless Internet service. Tethering allows the electronic device having Internet connection functionality to provide the Internet connection service to the other electronic device which lacks an Internet connection. For example, an electronic device (e.g., the first electronic device) which provides the tethering service may serve as an access point (AP) to provide the tethering service to an external electronic device (e.g., the second electronic device) which receives the tethering service. The external electronic device may access the electronic device which serves as the AP over a wired and/or wireless network and thus transmit and/or receive data for the wireless Internet service.

After connecting the first electronic device with the second electronic device through the internal network, a forwarding table may be formed or generated by the first electronic device by assigning or allocating a first IP address and a second IP address to the second electronic device (operation S200). The first IP address and the second IP address have different formats and are inter-translatable or interchangeable with each other. For example, the forwarding table may include the first IP address and the second IP address of the second electronic device, and may further include information associated with the second electronic device and the internal network. A configuration of the forwarding table will be described with reference to FIG. 9.

In some example embodiments, the forwarding table may include only a limited amount of information for a fast operation (e.g., a fast packet forwarding). As compared with a network address translation (NAT) table for NAT, the forwarding table may have a smaller size.

In some example embodiments, the first IP address may have a first format based on an Internet protocol of a first version, and the second IP address may have a second format based on an Internet protocol of a second version different from the first version. For example, the Internet protocol of the first version may be an Internet protocol version 4 (IPv4) protocol, and the Internet protocol of the second version may be an Internet protocol version 6 (IPv6) protocol. In addition, the first IP address and the second IP address may be inter-translated or interchanged with each other based on (e.g., using) a client side translator (CLAT).

When the second electronic device communicates with an external network through the internal network and the first electronic device, a packet processing may be performed by the first electronic device by performing an IP address translation on a first IP packet to be transmitted based on the forwarding table such that the first IP packet includes one of the first IP address and/or the second IP address of the second electronic device (operation S300).

In some example embodiments, the internal network may include a communication environment based on the Internet protocol of the first version (e.g., based on the IPv4 protocol), and the external network may include a communication environment based on the Internet protocol of the second version (e.g., based on the IPv6 protocol).

In some example embodiments, the NAT may not be performed when performing the IP address translation on the first IP packet, and thus the communication performance and efficiency may be improved or enhanced.

In some example embodiments, cases in which the second electronic device communicates with the external network may include a first case in which the first IP packet is transmitted from the external network to the second electronic device through the first electronic device and the internal network, and a second case in which the first IP packet is transmitted from the second electronic device to the external network through the internal network and the first electronic device. The first case will be described with reference to FIGS. 10 through 12, and the second case will be described with reference to FIGS. 13 and 14.

In a conventional wired/wireless tethering environment using IPv6/CLAT, when a packet is transmitted from a remote server to a tethered electronic device, a received packet having a CLAT IPv6 address is translated in an electronic device which provides a tethering service and is provided to the tethered electronic device. For example, the packet having the CLAT IPv6 address is translated, based on a CLAT, into a packet having an IPv4 address of the electronic device which provides the tethering service, and then is translated, based on a NAT, into a packet having an IPv4 address of the tethered electronic device. In other words, the received packet is translated twice, and thus the communication performance and efficiency are degraded. Similarly, when a packet is transmitted from the tethered electronic device to the remote server, the packet to be transmitted is translated twice. In addition, a NAT table is stored when using the NAT with an IP address translation and a port translation, however, excessive memory resources are used to maintain, search and/or translate the NAT table, and delay (e.g., processing delay, translation delay, etc.) and/or current consumption increase because a processor (e.g., a central processing unit (CPU)) is used to search and/or translate the NAT table.

In the method of translating the IP packet for the tethering service according to example embodiments, the first electronic device which provides the tethering service may form or generate the forwarding table including an IPv4 address and a CLAT IPv6 address of the second electronic device (or a tethered electronic device) which receives the tethering service, and the first electronic device may perform the IP address translation on the first IP packet transmitted between the second electronic device and the external network based on the forwarding table. In addition, the first IP packet may include one of the IPv4 address and/or the CLAT IPv6 address of the second electronic device instead of an address of the first electronic device. Accordingly, the address translation may be performed only once based on the forwarding table and without the NAT. Thus, delay (e.g., processing delay, translation delay, etc.) and memory usage may be reduced, and/or memory efficiency, communication performance and/or communication efficiency may be improved or enhanced.

Figure 2:
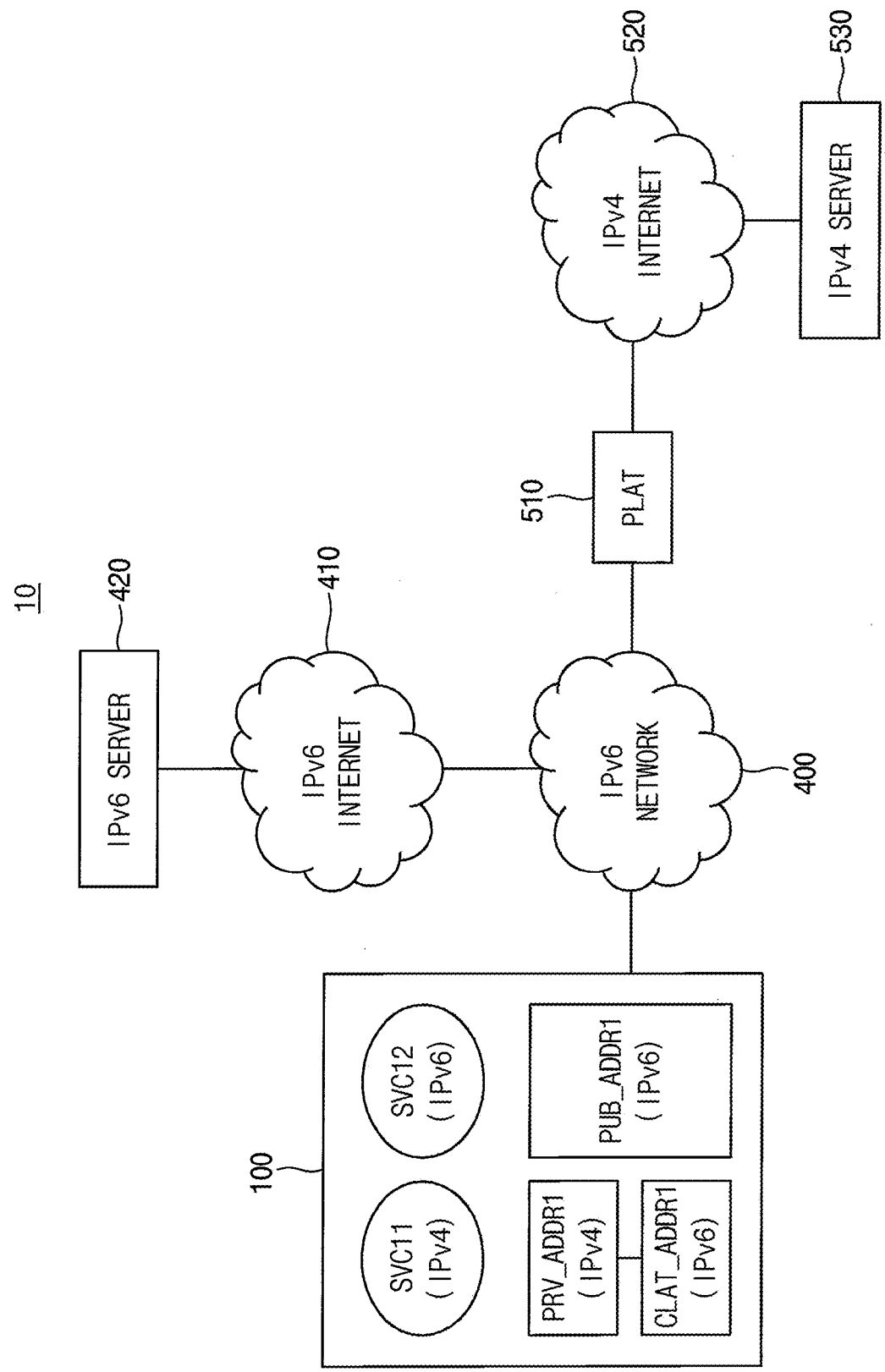
FIGS. 2 and 3 are block diagrams illustrating a communication system according to example embodiments.
Figure 3:
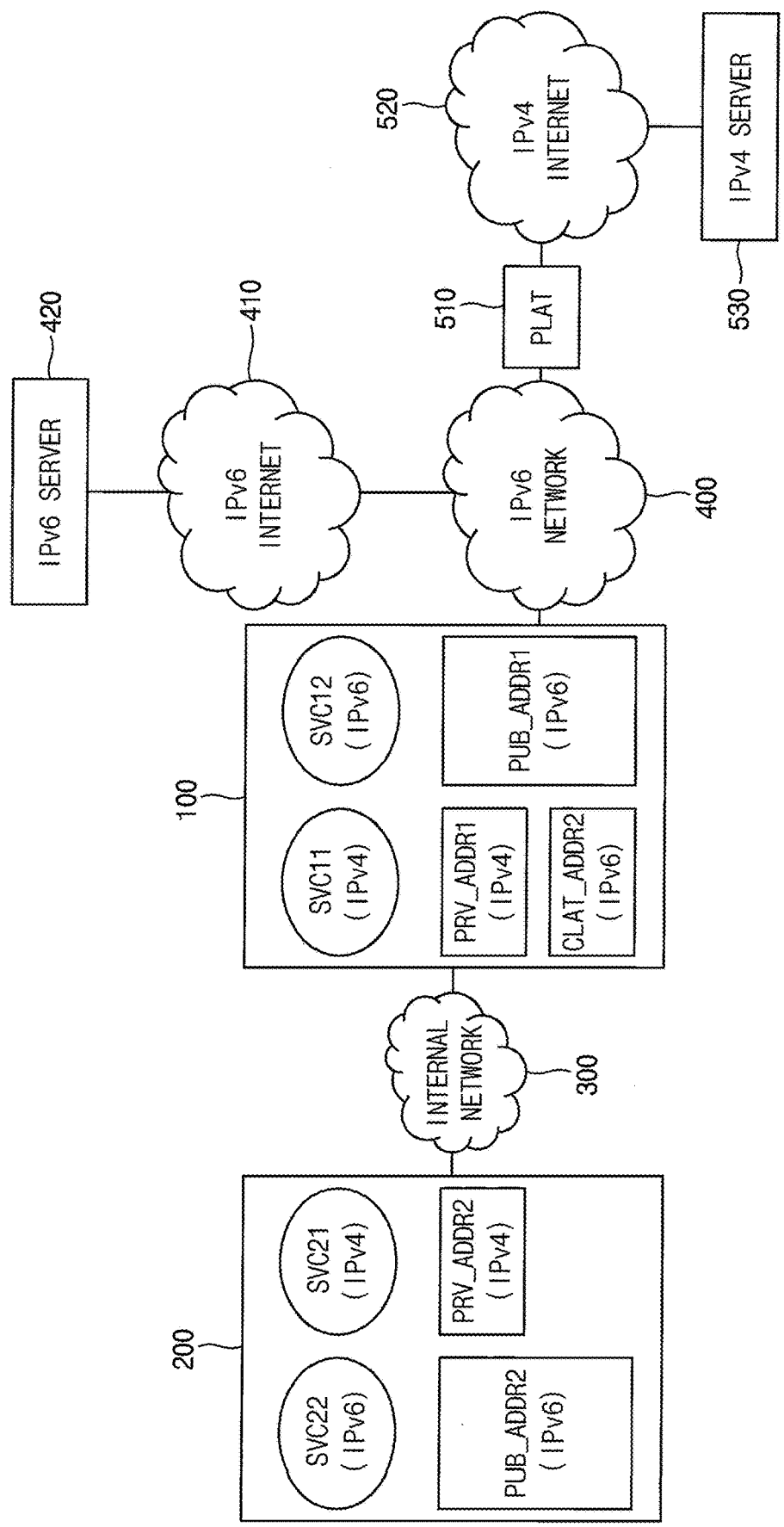

FIGS. 2 and 3 are block diagrams illustrating a communication system according to example embodiments. FIG. 2 illustrates a state before the second electronic device (or the tethered electronic device) is connected to the first electronic device, and FIG. 3 illustrates a state after the second electronic device (or the tethered electronic device) is connected to the first electronic device.

Referring to FIG. 2, a communication system 10 includes a first electronic device 100 and/or an external network (IPv6 network) 400. The communication system 10 may further include a first Internet network (IPv6 Internet) 410, a first server (IPv6 server) 420, a provider side translator (PLAT) 510, a second Internet network (IPv4 Internet) 520 and/or a second server (IPv4 server) 530.

The external network 400 may include any wireless network for exchanging data over a relatively long distance. For example, the external network 400 may perform a wireless mobile communication, such as a third-generation (3G) mobile communication, a fourth-generation (4G), a long term evolution (LTE) mobile communication, a fifth-generation (5G) mobile communication, and/or the like.

As described above, the external network 400 may include the communication environment based on the Internet protocol of the second version (e.g., based on the IPv6 protocol). The IPv6 protocol has been proposed to overcome the limitations of the IPv4 protocol, and a communication environment based on the IPv6 protocol is being implemented. However, services using the existing IPv4 protocol may still exist even in the communication environment based on the IPv6 protocol, and thus services (or servers) based on the IPv4 protocol and services (or servers) based on the IPv6 protocol may be mixed in the communication system 10.

The first electronic device 100 may be connected to an external server (e.g., the first server 420 and/or the second server 530) through the external network 400, and may execute services SVC11 and SVC12. For example, the service SVC11 may be a service based on the IPv4 protocol, and the service SVC12 may be a service based on the IPv6 protocol.

When the service SVC12 is to be executed, the first electronic device 100 may use a public (or global) IP address PUB_ADDR1. Since the public IP address PUB_ADDR1 is an address based on the IPv6 protocol and the external network 400 includes the communication environment based on the IPv6 protocol, the first electronic device 100 may access the first server 420 through the external network 400 and the first internet network 410 based on the public IP address PUB_ADDR1 (e.g., based on an IP packet including the public IP address PUB_ADDR1), without an address translation.

When the service SVC11 is to be executed, the first electronic device 100 may use a private IP address PRV_ADDR1. Since the private IP address PRV_ADDR1 is an address based on the IPv4 protocol and the external network 400 includes the communication environment based on the IPv6 protocol, the first electronic device 100 may translate the private IP address PRV_ADDR1 into a CLAT address CLAT_ADDR1 which is an address based on the IPv6 protocol, and may access the second server 530 through the external network 400, the PLAT 510 and the second internet network 520 based on the translated CLAT address CLAT_ADDR1 (e.g., based on an IP packet including the CLAT address CLAT_ADDR1).

In other words, to execute both a service using the IPv4 protocol (e.g., the service SVC11) and a service using the IPv6 protocol (e.g., the service SVC12), the first electronic device 100 may use all of a private IPv4 address (e.g., the private IP address PRV_ADDR1), a CLAT IPv6 address (e.g., the CLAT address CLAT_ADDR1) and a public IPv6 address (e.g., the public IP address PUB_ADDR1). In addition, a CLAT for translating the private IPv4 address into the CLAT IPv6 address may be embedded or mounted on (e.g., included and/or stored in) the first electronic device 100. For example, the private IPv4 address and the CLAT IPv6 address of the first electronic device 100 may be unique or intrinsic addresses of the first electronic device 100. Although only the IP address is illustrated in FIG. 2 for convenience of illustration, an IP packet including the IP address may be used by the first electronic device 100.

In some example embodiments, the first electronic device 100 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The first Internet network 410 and the first server 420 may be implemented to provide the service based on the IPv6 protocol. The first Internet network 410 and the first server 420 may be directly connected to the external network 400.

The second Internet network 520 and the second server 530 may be implemented to provide the service based on the IPv4 protocol. The second Internet network 520 and the second server 530 may not be directly connected to the external network 400 which includes the communication environment based on the IPv6 protocol, and may be connected to the external network 400 through the PLAT 510.

The PLAT 510 may be a component corresponding to the CLAT embedded on the first electronic device 100, and may translate the CLAT IPv6 address provided through the external network 400 into the private IPv4 address. The CLAT embedded on the first electronic device 100 and the PLAT 510 may be used to provide the service based on the IPv4 protocol in the communication environment based on the IPv6 protocol. The CLAT and PLAT 510 may be collectively referred to as 464XLAT.

Although only an operation in which the first electronic device 100 accesses the external server is described, an operation in which the external server transmits data to the first electronic device 100 may be performed in a reverse order of the above-described operation.

Referring to FIG. 3, a communication system 20 includes a first electronic device 100, a second electronic device 200, an internal network 300 and/or an external network 400. The communication system 20 may further include a first Internet network 410, a first server 420, a PLAT 510, a second Internet network 520 and/or a second server 530.

The communication system 20 of FIG. 3 may be substantially the same as the communication system 10 of FIG. 2, except that the communication system 20 further includes the second electronic device 200 and the internal network 300. The descriptions repeated with FIG. 2 will be omitted.

The internal network 300 may include any wired/wireless network for exchanging data over a relatively short distance. For example, the internal network 300 may perform a communication based on one of a universal serial bus (USB), Bluetooth and/or Wireless Fidelity (WiFi). Typically, the tethering service may be classified into a USB tethering, a Bluetooth tethering and a hotspot (or a mobile hotspot) using a wireless local area network (WLAN) such as a WiFi. As described above, the internal network 300 may include the communication environment based on the Internet protocol of the first version (e.g., based on the IPv4 protocol).

The second electronic device 200 may be connected to the first electronic device 100 through the internal network 300, and may receive the tethering service through the first electronic device 100. For example, the second electronic device 200 may be connected to the external server (e.g., the first server 420 and/or the second server 530) through the internal network 300, the first electronic device 100 and the external network 400, and may execute services SVC21 and SVC22 similarly to the first electronic device 100. For example, the service SVC21 may be a service based on the IPv4 protocol, and the service SVC22 may be a service based on the IPv6 protocol.

When the service SVC21 is to be executed, the second electronic device 200 may use a private IP address PRV_ADDR2. Since the private IP address PRV_ADDR2 is an address based on the IPv4 protocol and the internal network 300 includes the communication environment based on the IPv4 protocol, the second electronic device 200 may provide the private IP address PRV_ADDR2 to the first electronic device 100 through the internal network 300. As with the case in which the service SVC11 is executed, the first electronic device 100 may translate the private IP address PRV_ADDR2 of the second electronic device 200 into a CLAT address CLAT_ADDR2 which is an address based on the IPv6 protocol, and may access the second server 530 through the external network 400, the PLAT 510 and the second internet network 520 based on the translated CLAT address CLAT_ADDR2. For example, a private IPv4 address (e.g., the private IP address PRV_ADDR2) and a CLAT IPv6 address (e.g., the CLAT address CLAT_ADDR2) of the second electronic device 200 may be unique or intrinsic addresses of the second electronic device 200.

In the communication system 20 according to example embodiments, the CLAT translation may be performed only once, and without the NAT, when the first electronic device 100 provides the tethering service to the second electronic device 200.

When the service SVC22 is to be executed, the second electronic device 200 may use a public IP address PUB_ADDR2. Although not illustrated in FIG. 3, each of the first electronic device 100 and the second electronic device 200 may include a private IPv6 address for the service SVC22, and the internal network 300 may also include a communication environment based on the IPv6 protocol or the communication system 20 may further include another internal network including the communication environment based on the IPv6 protocol. The execution of the service SVC22 using the private IPv6 address may be performed using methods and/or implementations known to a person of ordinary skill in the art, and thus the illustration and description thereof will be omitted.

Figure 4:
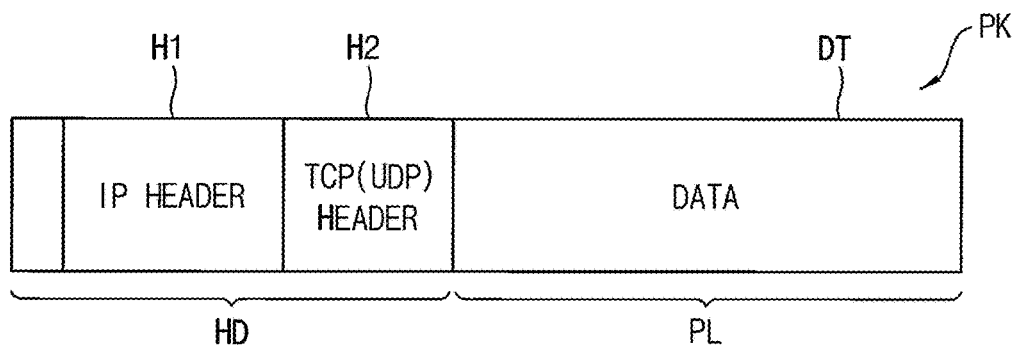
FIG. 4 is a diagram illustrating an example of an IP packet transmitted in a communication system according to example embodiments.
Figure 5A:
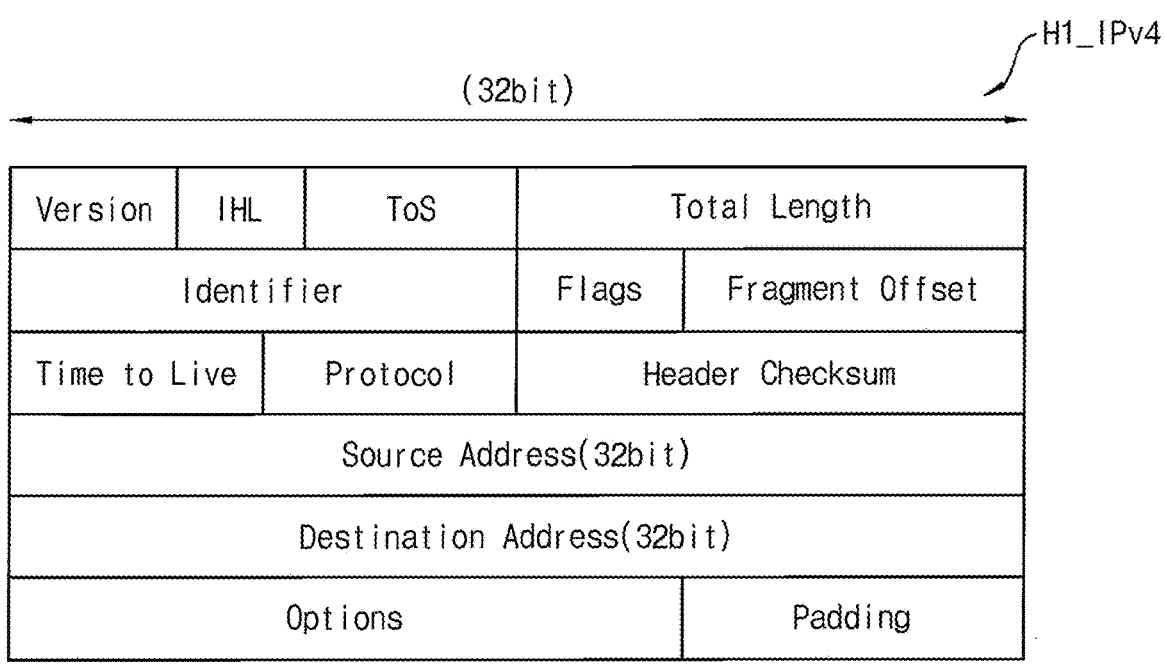
FIGS. 5A, 5B and 5C are diagrams illustrating examples of a header included in an IP packet of FIG. 4.
Figure 5B:
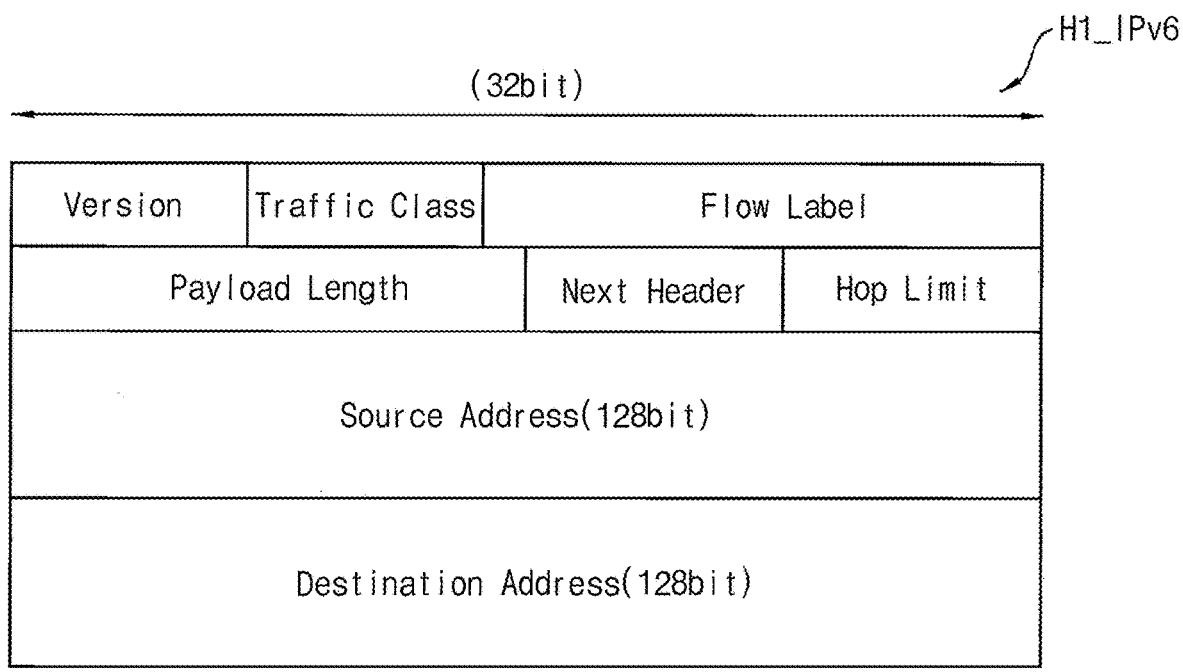
Figure 5C:
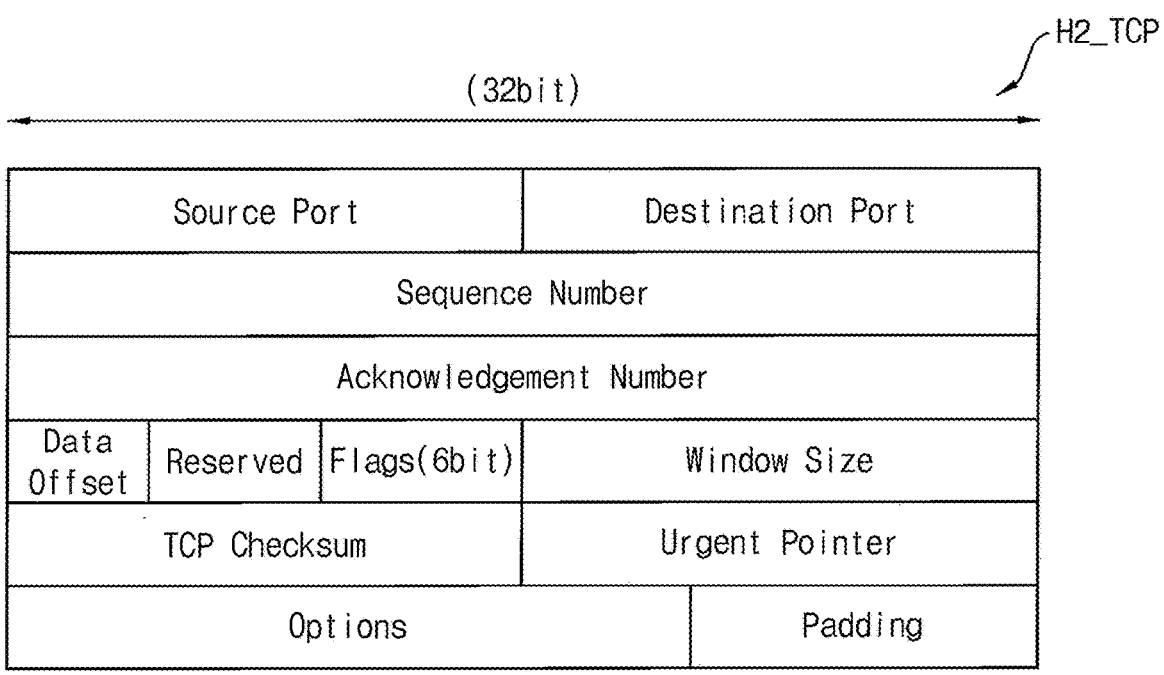

FIG. 4 is a diagram illustrating an example of an IP packet transmitted in a communication system according to example embodiments. FIGS. 5A, 5B and 5C are diagrams illustrating examples of a header included in an IP packet of FIG. 4. FIG. 5A illustrates a header of an IPv4 packet, FIG. 5B illustrates a basic header of an IPv6 packet, and FIG. 5C illustrates a transmission control protocol (TCP) header.

Referring to FIG. 4, an IP packet PK may include a header HD and/or a payload PL, etc., but is not limited thereto. The header HD may include an IP header H1 and/or a TCP header H2 (or a user datagram protocol (UDP) header, etc.), and the payload PL may include data DT, which is provided to an application program and/or generated by the application program. As will be described later, the IP header H1 may include address information, and the TCP header H2 may include port information.

Referring to FIG. 5A, a header H1_IPv4 of an IPv4 packet (hereinafter, referred to as an IPv4 header) may include respective fields for a version, an IP header length IHL, a service type ToS, a total length, an identifier, flags, a fragment offset, a time-to-live, a protocol, a header checksum, a source address, a destination address, options, and/or a padding, but is not limited thereto. Each of the source address and the destination address may have a length of 32 bits, but is not limited thereto, and lengths of the options and the padding may be variable.

Referring to FIG. 5B, a basic header H1_IPv6 of an IPv6 packet (hereinafter, referred to as an IPv6 header) may include respective fields for a version, a traffic class, a flow label, a payload length, a next header, a hop limit, a source address, and/or a destination address, but is not limited thereto. Each of the source address and the destination address may have a length of 128 bits, but is not limited thereto.

As illustrated in FIGS. 5A and 5B, the IPv4 header H1_IPv4 may include twelve basic fields, and the IPv6 header H1_IPv6 may include eight basic fields, but are not limited thereto. However, the IPv6 packet may further include an extension header in addition to the basic header (e.g., the IPv6 header H1_IPv6). In the IPv6 header H1_IPv6, a next header field may refer to a type of a next header, etc. A header that may be indicated in the next header may be an IPv6 extension header or a TCP (or UDP, etc.) header, which is an upper-layer header. When an extension header is not used, the TCP (or UDP, etc.) header may be located in the next header.

The IPv4 header H1_IPv4 and the IPv6 header H1_IPv6 may both include the fields for the version, the source address, and the destination address, etc. However, as described above, the length (e.g., 128 bits) of each of the source address and the destination address of the IPv6 header H1_IPv6 may be four times the length (e.g., 32 bits) of each of the source address and the destination address of the IPv4 header H1_IPv4.

When the IPv4 header H1_IPv4 is translated into the IPv6 header H1_IPv6, the fields for the IP header length IHL, the identifier, the flags, the fragment offset, the header checksum, the options, and the padding, etc., included in the IPv4 header H1_IPv4 may be deleted, and the field for the flow label may be added. Conversely, when the IPv6 header H1_IPv6 is translated into the IPv4 header H1_IPv4, the field for the flow label may be deleted, and the fields for the IP header length IHL, the identifier, the flags, the fragment offset, the header checksum, the options, and the padding, etc., may be added. The fields for the service type ToS, the total length, the protocol, the time-to-live of the IPv4 header H1_IPv4 and the fields for the traffic class, the payload length, the next header, and the hop limit of the IPv6 header H1_IPv6 may be translated into each other.

Referring to FIG. 5C, a TCP header H2_TCP may include respective fields for a source port, a destination port, a sequence number, an acknowledgement number, a data offset, a reserved field 'Reserved', 6-bit flags, a window size, a TCP checksum, an urgent pointer, options, and/or a padding, etc. Although not illustrated, as with the TCP header H2_TCP, a UDP header, which is a transmission protocol, may include respective fields for a source port, a destination port, a UDP length, and/or a UDP checksum, etc.

Figure 6:
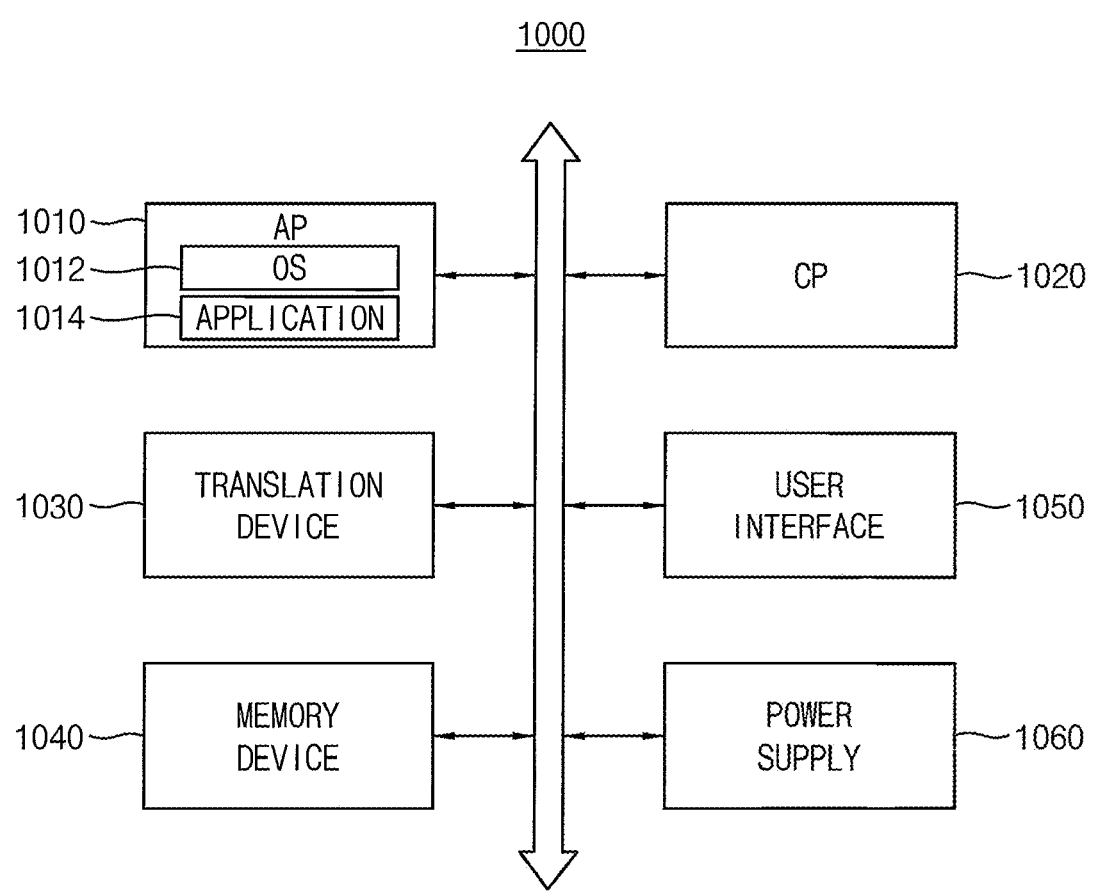
FIG. 6 is a block diagram illustrating a first electronic device included in a communication system according to example embodiments.

FIG. 6 is a block diagram illustrating a first electronic device included in a communication system according to example embodiments. FIG. 6 illustrates a hardware configuration of the first electronic device.

Referring to FIG. 6, a first electronic device 1000 includes an application processor (AP) 1010, a communication processor (CP) 1020, a translation device 1030, a memory device 1040, a user interface 1050 and/or a power supply 1060. According to some example embodiments, operations described herein as being performed by the first electronic device 1000, the application processor 1010, the communication processor 1020 and/or the translation device 1030 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. According to some example embodiments, the first electronic device 100 may be implemented using the first electronic device 1000, and the second electronic device 200 may be the same as or similar to the first electronic device 1000. In some example embodiments, the second electronic device 200 may lack the translation device 1030.

The first electronic device 1000 may be an electronic device configured to perform data communication with at least one other electronic device. For example, the first electronic device 1000 may be one of a smartphone, a tablet personal computer (PC), a laptop computer, a drone, a digital camera, a wearable computer, an Internet of Things (IoT) device, a vehicle driving device, a virtual reality device, an augmented reality device, and/or various other smart devices. In addition, the first electronic device 1000 may be one of various electronic devices configured to perform data communication with an external electronic device through wired/wireless networks.

The application processor 1010 may drive (e.g., execute) an operating system (OS) 1012 of the first electronic device 1000 and/or various application programs 1014 to control a plurality of hardware and/or software components connected to the application processor 1010, and process and/or calculate various data including multimedia data. For example, the application processor 1010 may be embodied by a system-on-chip (SoC), an FPGA, a multi-core processor, a multi-processor system, etc.

The communication processor 1020 may transceive (e.g., transmit and/or receive) data during communication with other electronic devices connected through a network. In the data transceiving process, the communication processor 1020 may transmit and receive data to and from the application processor 1010. When the first electronic device 1000 receives data through the network, for example, when the first electronic device 1000 performs a data download operation, the communication processor 1020 may transmit the received data to the application processor 1010, and the application processor 1010 may perform data processing operations, such as data calculation and storage operations. Conversely, when the first electronic device 1000 transmits data through the network, for example, when the first electronic device 1000 performs a data upload operation, the application processor 1010 may transmit data to be uploaded to the communication processor 1020, and the communication processor 1020 may then transmit the data through the network.

The translation device 1030 may perform the method of translating the IP packet according to example embodiments described with reference to FIG. 1. As described with reference to FIG. 4, data may be transmitted and/or received as a type of an IP packet, and the translation device 1030 may perform only the CLAT translation once without the NAT to translate an address of the IP packet. For example, the translation device 1030 may translate a destination address of an IP packet received through an external network (e.g., the external network 400 in FIG. 3) into an address suitable or appropriate for a second electronic device (e.g., the second electronic device 200 in FIG. 3) which is a tethered electronic device, and/or may translate a source address of an IP packet received through the second electronic device and an internal network (e.g., the internal network 300 in FIG. 3) into an address suitable or appropriate for the external network.

The CLAT may be a technique for translating an IPv4 header of an IP packet into an IPv6 header of an IP packet and/or conversely translating an IPv6 header into an IPv4 header, so that one electronic device may freely communicate with other electronic devices through a network that is based on a specific Internet protocol (e.g., IPv6 or IPv4, etc.). The NAT may be a technique for translating a private IP address (and/or an internal IP address associated with a private network, local network, intranet, etc.) into a public IP address (and/or a global IP address, for example an IP address accessible via the Internet, across networks, etc.) and/or conversely translating a public IP address into a private IP address. An IP address value and a port number of the source address and/or the destination address may be changed according to the NAT.

In some example embodiments, at least a part of the translation device 1030 may be implemented as hardware. For example, at least a part of the translation device 1030 may be included in a computer-based electronic system. In some example embodiments, at least a part of the translation device 1030 may be implemented as instruction codes or program routines (e.g., a software program). For example, the instruction codes or the program routines may be executed by a computer-based electronic system, and may be stored in any storage device (e.g., the memory device 1040) located inside or outside the computer-based electronic system. In some example embodiments, as will be described with reference to FIGS. 16 and 17, the translation device 1030 may be included in the application processor 1010 or the communication processor 1020. A detailed configuration of the translation device 1030 will be described with reference to FIG. 7.

The memory device 1040 may store instructions or data, which are received from the application processor 1010 and/or the communication processor 1020, and/or generated by the application processor 1010, but is not limited thereto. For example, the memory device 1040 may include at least one of various volatile memories such as a dynamic random access memory (DRAM), a static random access memory (SRAM), or the like, and/or at least one of various nonvolatile memories such as an electrically erasable programmable read-only memory (EEPROM), a flash memory, a phase change random access memory (PRAM), a resistance random access memory (RRAM), a magnetic random access memory (MRAM), a ferroelectric random access memory (FRAM), a nano floating gate memory (NFGM), a polymer random access memory (PoRAM), or the like.

The user interface 1050 may include at least one input device such as a keypad, a button, a microphone, a touch screen, etc., and/or at least one output device such as a speaker, or a display device, etc. The power supply 1060 may provide power to the first electronic device 1000.

Figure 7:
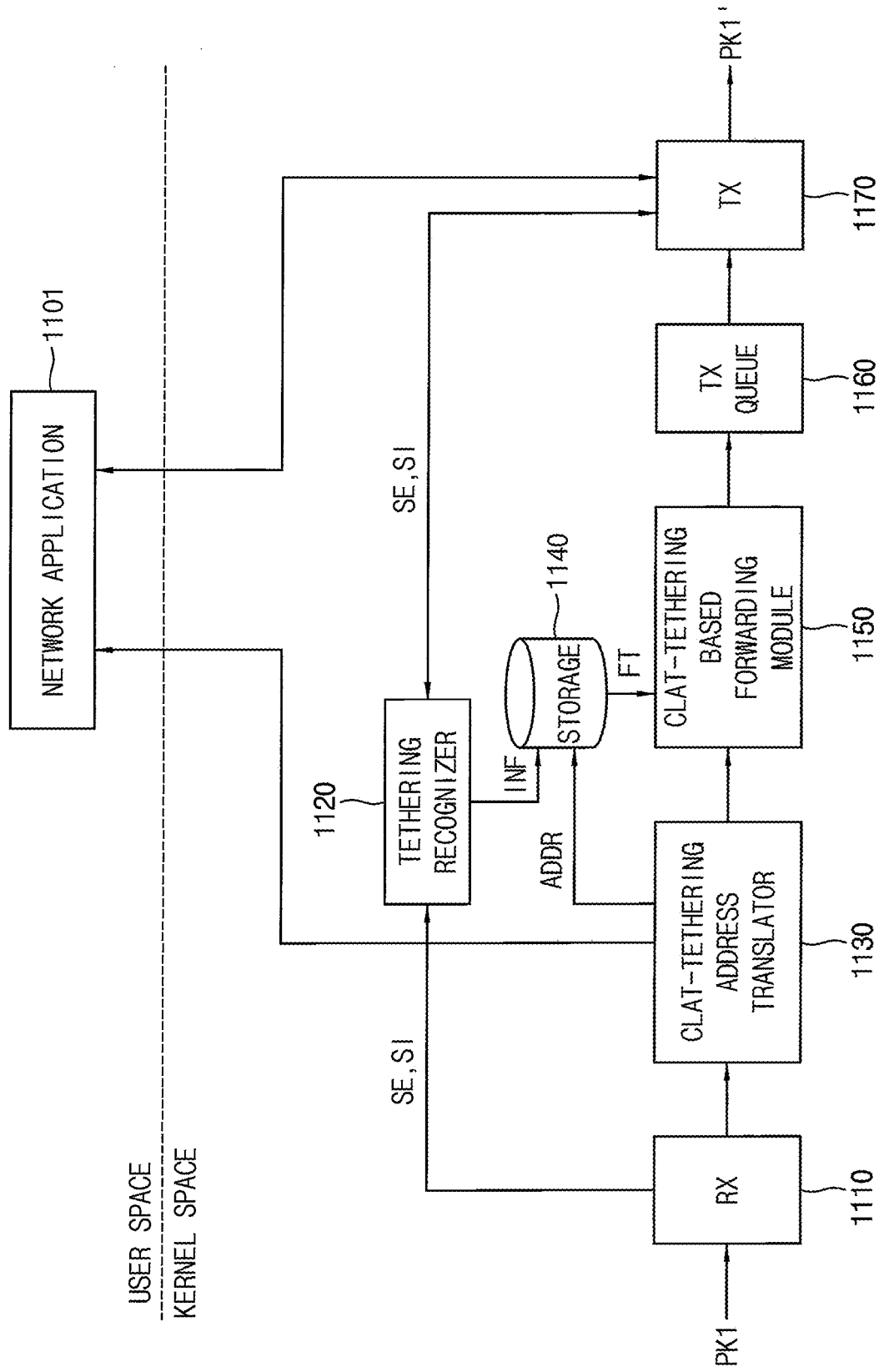
FIG. 7 is a block diagram illustrating an example of a translation device included in a first electronic device of FIG. 6.

FIG. 7 is a block diagram illustrating an example of a translation device included in a first electronic device of FIG. 6.

Referring to FIG. 7, a translation device (e.g., the translation device 1030) included in a first electronic device (e.g., the first electronic device 1000 of FIG. 6) may include a receiver (RX) 1110, a tethering recognizer 1120, an address translator (CLAT-Tethering Address Translator) 1130, a storage 1140, a forwarding module (CLAT-Tethering based Forwarding Module) 1150, a transmitter (TX) 1170 and/or a transmission queue (TX Queue) 1160. According to some example embodiments, operations described herein as being performed by the receiver 1110, the tethering recognizer 1120, the address translator 1130, the forwarding module 1150 and/or the transmitter 1170 may be performed by processing circuitry.

The receiver 1110 may receive a first IP packet PK1 to be transmitted when a second electronic device (e.g., the second electronic device 200 in FIG. 3) communicates with an external network (e.g., the external network 400 in FIG. 3) based on a tethering service. For example, the first IP packet PK1 may be received from the external network 400 when the above-described data download or downlink operation is performed, and the first IP packet PK1 may be received from the second electronic device 200 when the above-described data upload or uplink operation is performed. According to some example embodiments, the receiver 1110 receives the first IP packet PK1 from the external network, and/or the second electronic device 200, via the communication processor 1020. As described with reference to FIGS. 5A and 5B, the first IP packet PK1 may include a source address, a destination address, a source port and a destination port. In FIG. 7, an arrow which is not specifically denoted by a signal name may represent a flow of the first IP packet and/or corresponding data.

The tethering recognizer 1120 may manage (e.g., determine) a tethering connection state with the second electronic device, and may obtain information associated with the second electronic device and/or an internal network (e.g., the internal network 300 in FIG. 3). For example, the tethering recognizer 1120 may operate as an event listener that receives information or event SE associated with a state (e.g., connection or disconnection) of the internal network to dynamically recognize the connection of the second electronic device. In addition, the tethering recognizer 1120 may operate as an information obtainer that obtains information SI including a medium access control (MAC) address of the second electronic device and/or interface information of the internal network.

The address translator 1130 may generate a first IP address (e.g., an IPv4 address) and/or a second IP address (e.g., a CLAT IPv6 address) that have different formats and are inter-translatable or interchangeable with each other, may assign or allocate the first IP address and the second IP address to the second electronic device, and may perform an IP address translation on the first IP packet PK1 such that the first IP packet PK1 includes one of the first IP address and the second IP address of the second electronic device. For example, the second IP address may be dependent on the second electronic device.

The storage 1140 may store and/or provide a forwarding table FT. The forwarding table FT may be formed or generated by the tethering recognizer 1120 and/or the address translator 1130, and may include the first IP address, the second IP address, the MAC address and/or the interface information. For example, the first IP address and the second IP address may be obtained based on information ADDR provided from the address translator 1130, and the MAC address and the interface information may be obtained based on information INF provided from the tethering recognizer 1120. For example, the storage 1140 may include any volatile memory and/or nonvolatile memory. According to some example embodiments, the storage 1140 is the same as or included in the memory device 1040.

In some example embodiments, the forwarding table FT may maintain (e.g., store and/or record) a limited number of tables for fast forwarding. For example, the forwarding table FT may allow one table for a wired interface and up to 15 tables for a wireless interface for a WiFi address translation.

The forwarding module 1150 may perform a packet processing on the first IP packet PK1 based on the forwarding table FT. For example, the forwarding module 1150 may form or generate a MAC header for the first IP packet PK1, may assign or allocate a CPU to perform a forwarding, and may request the packet as an active forwarding. Since the packet processing is performed based on the forwarding table FT, the packet processing may be performed faster than a conventional packet processing using the NAT, and thus the forwarding module 1150 may be referred to as a fast forwarding module or a CLAT-tethering based fast forwarding module. In addition, the forwarding module 1150 may be referred to as an interface selector.

The transmission queue 1160 may queue (or queue-in) the packet-processed first IP packet PK1. According to some example embodiments, the transmission queue 1160 may be a buffer implemented using a memory (e.g., a volatile memory, non-volatile memory and/or the storage 1140). The transmitter 1170 may transmit the queued first IP packet PK1. A first IP packet PK1' transmitted through the transmitter 1170 may represent an IP packet on which the IP address translation is performed, and thus may be denoted by a signal name different from the first IP packet PK1 received by the receiver 1110. For example, the first IP packet PK1' on which the IP address translation is performed may be transmitted to the second electronic device when the above-described data download or downlink operation is performed, and the first IP packet PK1' on which the IP address translation is performed may be transmitted to the external network when the above-described data upload or uplink operation is performed. According to some example embodiments, the transmitter 1170 transmits the queued first IP packet PK1 to the external network, and/or the second electronic device, via the communication processor 1020. The transmission queue 1160 and the transmitter 1170 may be collectively referred to as an active forwarding module.

A network application 1101 executed on a user space (e.g., using processing circuitry) may perform data processing and calculation based on the received first IP packet PK1 and/or data corresponding thereto, and may provide a result of the data processing and calculation to the transmitter 1170. The network application 1101 may correspond to (e.g., may be the same as or similar to) the application program 1014 in FIG. 6.

Although FIG. 7 illustrates an example where components included in the translation device are implemented in the form of software executed on a kernel space, example embodiments are not limited thereto. For example, at least a part of the receiver 1110, the tethering recognizer 1120, the address translator 1130, the storage 1140, the forwarding module 1150, the transmission queue 1160 and/or the transmitter 1170 (e.g., the address translator 1130) may be implemented in the form of separate hardware or hardware included in the application processor 1010 and/or the communication processor 1020.

Figure 8:
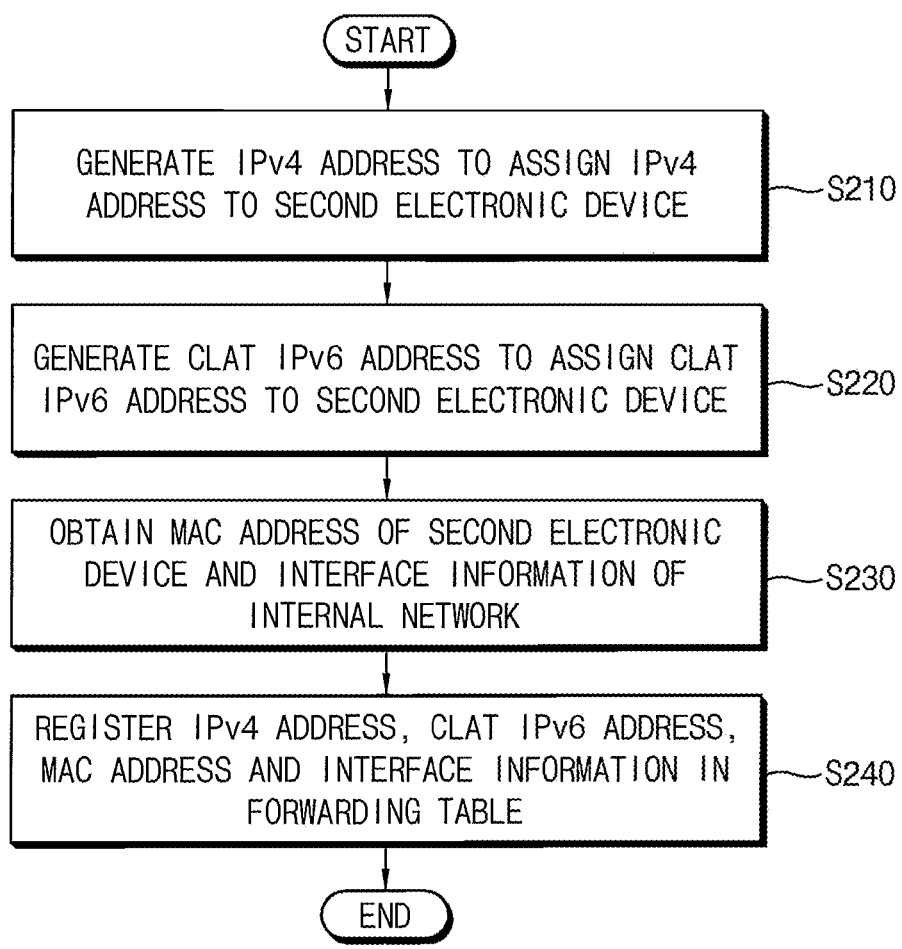
FIG. 8 is a flowchart illustrating an example of forming a forwarding table in FIG. 1.
Figure 9:
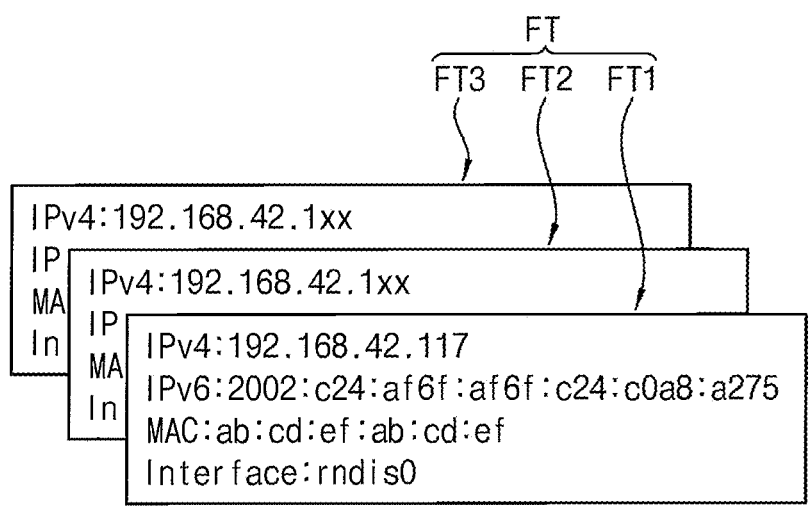
FIG. 9 is a diagram illustrating an example of a forwarding table formed by an operation of FIG. 8.

FIG. 8 is a flowchart illustrating an example of forming a forwarding table in FIG. 1. FIG. 9 is a diagram illustrating an example of a forwarding table formed by an operation of FIG. 8.

Referring to FIGS. 1, 3, 7 and 8, when forming the forwarding table (e.g., operation S200 in FIG. 1), the tethering recognizer 1120 that operates as the event listener may be enabled or activated (e.g., registered) first, and then the second electronic device 200 may be connected to the first electronic device 100 through the internal network 300 to receive the tethering service, although not illustrated in detail.

After that, an IPv4 address may be generated to assign the IPv4 address to the second electronic device 200 (operation S210), and a CLAT IPv6 address may be generated to assign the CLAT IPv6 address to the second electronic device 200 (operation S220). The IPv4 address in operation S210 may correspond to the first IP address in FIG. 1, and the CLAT IPv6 address in operation S220 may correspond to the second IP address in FIG. 1. The CLAT IPv6 address may be an IPv6 address that is capable of being translated from an IPv6 address to an IPv4 address and vice versa.

In addition, a MAC address of the second electronic device 200 and interface information of the internal network 300 may be obtained (operation S230).

In some example embodiments, the CLAT IPv6 address corresponding to the second IP address and the MAC address (and/or the interface information) may be registered as a destination address. For example, the destination address may be registered in the forwarding module 1150 (or the interface selector).

The IPv4 address, the CLAT IPv6 address, the MAC address and the interface information may be registered in the forwarding table FT (e.g., in association with one another) (operation S240). As a result, CLAT-tethering based forwarding or packet translation process or NAT-less forwarding or packet translation process according to example embodiments may be enabled or activated.

In some example embodiments, operations S210 and S220 may be performed by the address translator 1130, operation S230 may be performed by the tethering recognizer 1120, and operation S240 may be performed by the address translator 1130 and the tethering recognizer 1120.

Referring to FIG. 9, the forwarding table FT may include a first table FT1, a second table FT2 and/or a third table FT3.

The first table FT1 may include an IPv4 address, an IPv6 address, a MAC address and interface information of the second electronic device 200. The IPv6 address may be a CLAT IPv6 address which is inter-translated or interchanged with the IPv4 address. Similarly, each of the second table FT2 and the third table FT3 may include an IPv4 address, an IPv6 address, a MAC address and interface information of a respective one of a third electronic device and a fourth electronic device that are different from the second electronic device 200 and receive the tethering service from the first electronic device 100.

Although FIG. 9 illustrates an example where the forwarding table FT includes three tables FT1, FT2 and FT3, example embodiments are not limited thereto, and the number of tables included in the forwarding table FT may be changed according to example embodiments. However, as described above, the forwarding table FT may include a limited number of tables for the fast forwarding.

Figure 10:
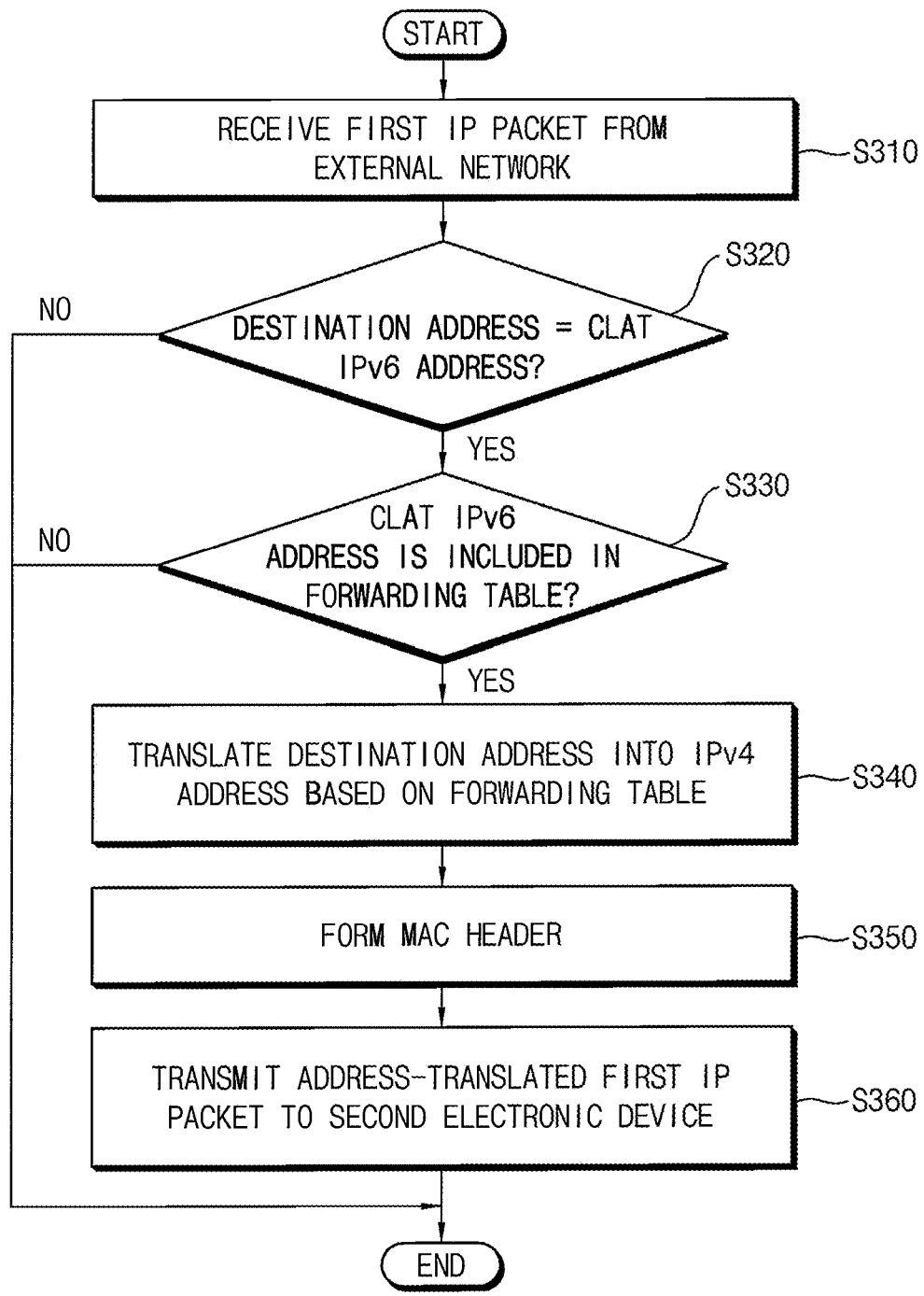
FIGS. 10 and 11 are flowcharts illustrating examples of performing packet processing in FIG. 1.
Figure 11:
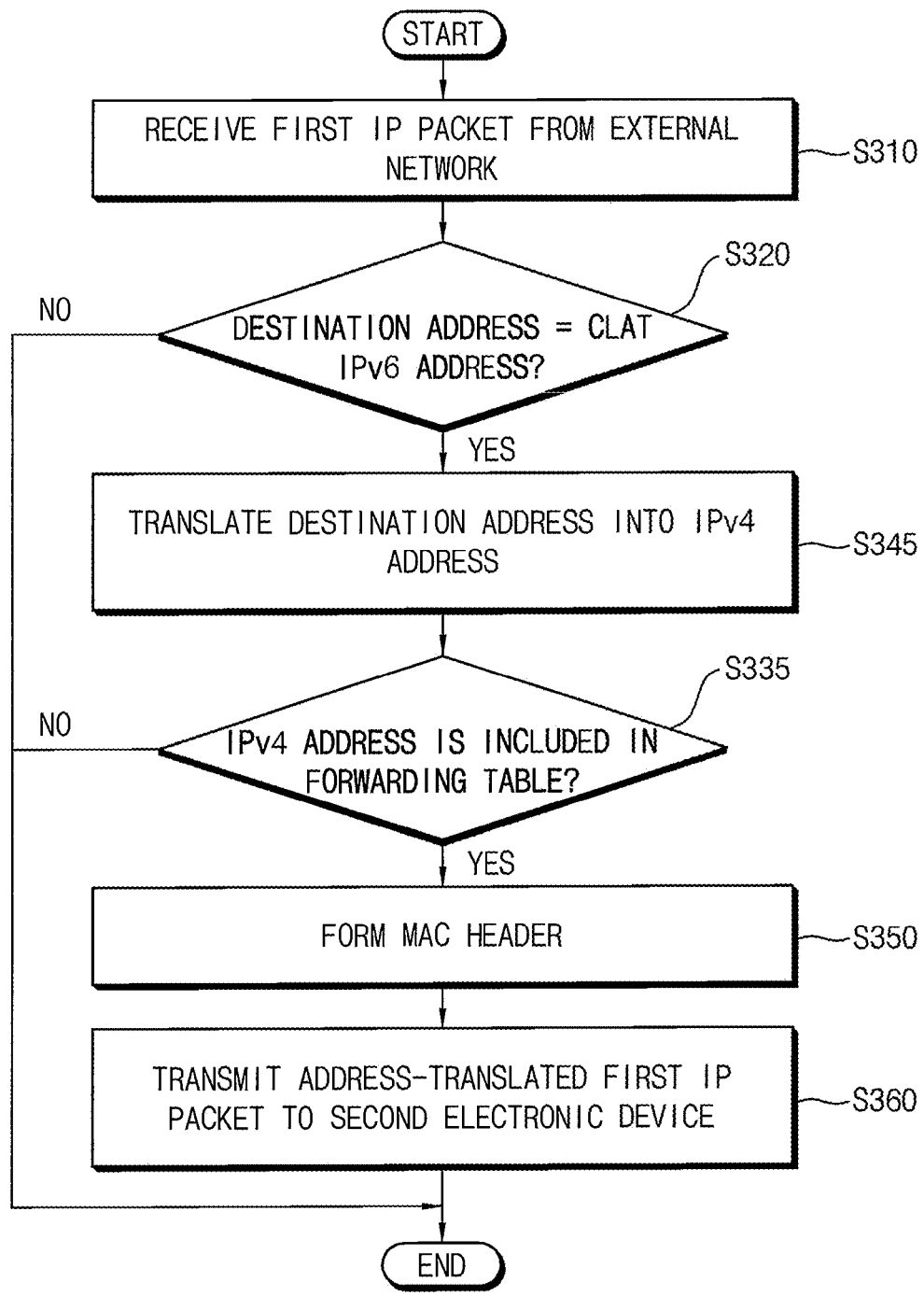
Figure 12:
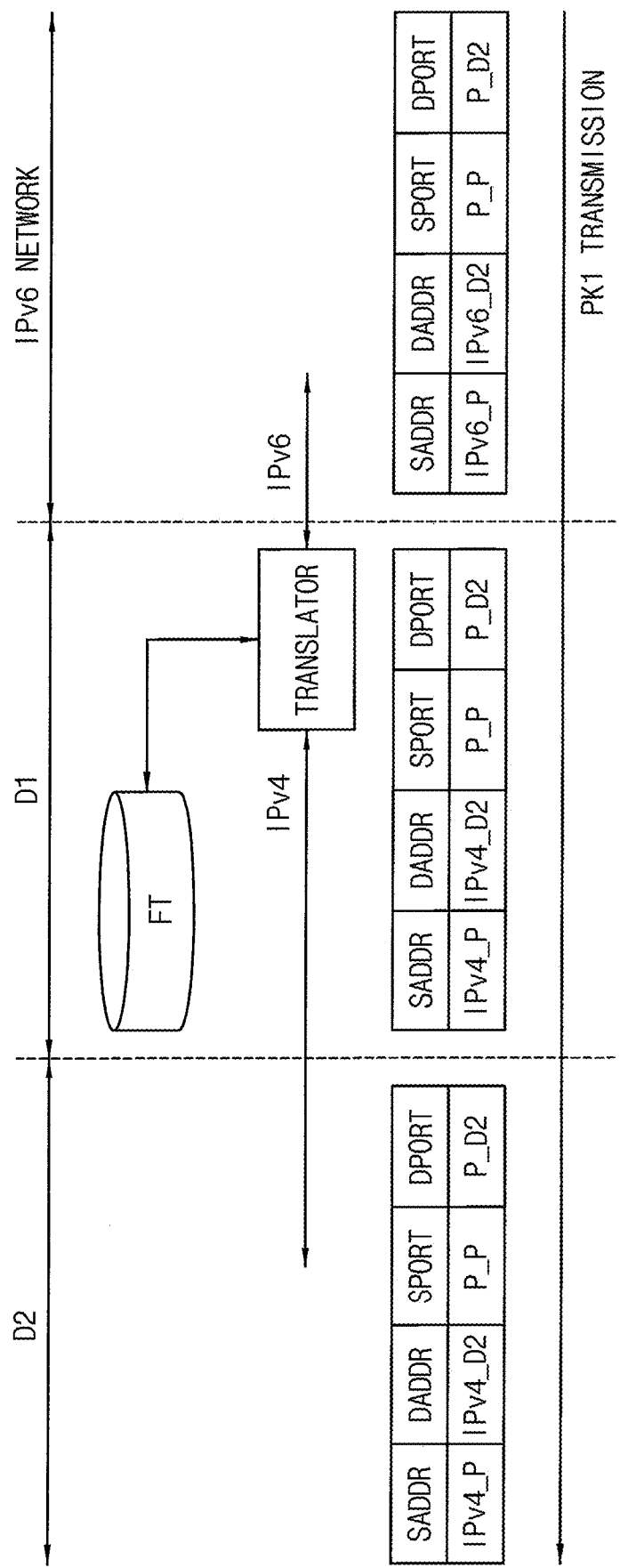
FIG. 12 is a diagram for describing operations of FIGS. 10 and 11.

FIGS. 10 and 11 are flowcharts illustrating examples of performing packet processing in FIG. 1. FIG. 12 is a diagram for describing operations of FIGS. 10 and 11. FIGS. 10 and 11 illustrate the first case in which the first IP packet is transmitted from the external network to the second electronic device through the first electronic device and the internal network.

Referring to FIGS. 1, 3, 7 and 10, when performing the packet processing (operation S300 in FIG. 1), the first IP packet PK1 including a source address, a destination address, a source port and a destination port (e.g., a port of the second electronic device) may be received from the external network 400 (operation S310). For example, a packet reception interrupt may be generated, and a soft interrupt for a packet reception processing may be triggered.

By passing through a CLAT translation filter, it may be checked or determined whether the destination address included in the first IP packet PK1 is a CLAT IPv6 address which is a format translatable IP address or a public IP address which is a format untranslatable IP address (operation S320). According to some example embodiments, operation S320 may include checking or determining whether the destination is a format translatable address or a public IP address.

When the destination address is the CLAT IPv6 address (operation S320: YES), the forwarding table FT may be searched, and it may be checked whether the destination address is a CLAT IPv6 address included in the forwarding table FT (e.g., the second IP address) (operation S330). According to some example embodiments, operation S330 may be performed based on, or in response to, the destination address being the format translatable address (operation S320: YES).

When the destination address is the CLAT IPv6 address included in the forwarding table FT (operation S330: YES), this may represent that the first IP packet PK1 should be provided to the second electronic device 200 by the tethering service, and thus the destination address may be translated into an IPv4 address (e.g., the first IP address) based on the forwarding table FT (operation S340). For example, an address translation for translating the destination address may be performed only once (e.g., between operations S310 and S360), and the source address may also be translated together. In addition, since the NAT is not performed, the destination port may not be translated (e.g., between operations S310 and S360) and may be maintained (e.g., the destination port of the first IP packet PK1 as received in operation S310 may be the same as or similar to a destination port of an address-translated first IP packet PK1' transmitted in operation S360).

A MAC header for the first IP packet PK1 may be formed or generated (operation S350). For example, the MAC header for the first IP packet PK1 may be formed based on the MAC address of the second electronic device 200 and the interface information of the internal network 300 (e.g., a MAC address of an interface connected to IPv4). In some example embodiments, operation S350 may be omitted if there is no MAC header.

The address-translated first IP packet PK1' may be transmitted to the second electronic device 200 through the internal network 300 (operation S360). For example, an active forwarding may be requested, a packet to be forwarded may be queued, a soft interrupt for forwarding may be triggered, and/or a transmission process may be performed.

When the destination address is not the CLAT IPv6 address (operation S320: NO), or when the destination address is not the CLAT IPv6 address included in the forwarding table FT (operation S330: NO), the method of translating the IP packet according to example embodiments may be terminated, and a server connection operation or a data transmission operation may be performed based on a public IPv6 address or another address.

Referring to FIGS. 1, 3, 7 and 11, when performing the packet processing (operation S300 in FIG. 1), operations S310, S320, S350 and S360 in FIG. 11 may be substantially the same as operations S310, S320, S350 and S360 in FIG. 10, respectively. The descriptions repeated with FIG. 10 will be omitted.

When the destination address is the CLAT IPv6 address (operation S320: YES), a format of the destination address may be translated (operation S345). For example, the destination address may be translated into an IPv4 address. According to some example embodiments, operation S345 may be performed based on, or in response to, the destination address being the format translatable address (operation S320: YES).

The forwarding table FT may be searched, and it may be checked whether the format-translated destination address (e.g., the translated IPv4 address) is an IPv4 address included in the forwarding table FT (e.g., the first IP address) (operation S335).

When the format-translated destination address is the IPv4 address included in the forwarding table FT (operation S335: YES), this may represent that the first IP packet PK1 should be provided to the second electronic device 200 by the tethering service, and thus operations S350 and S360 may be performed.

When the format-translated destination address is not the IPv4 address included in the forwarding table FT (operation S335: NO), the IP packet according to example embodiments may be terminated.

Referring to FIG. 12, when the first IP packet PK1 is transmitted from an external network (e.g., an IPv6 network) to a second electronic device D2 through a first electronic device D1, changes in a source address SADDR, a destination address DADDR, a source port SPORT and/or a destination port DPORT included in the first IP packet PK1 are illustrated.

In the external network, the source address SADDR and the destination address DADDR of the first IP packet PK1 may be IPv6_P and IPv6_D2 conforming to the IPv6 protocol. In the first electronic device D1, a translator (e.g., the address translator 1130 in FIG. 7) may translate the source address SADDR and the destination address DADDR of the first IP packet PK1 into IPv4_P and IPv4_D2 conforming to the IPv4 protocol to transmit the address-translated first IP packet to the second electronic device D2. In the second electronic device D2, the source address SADDR and the destination address DADDR may be maintained as IPv4_P and IPv4_D2. In all cases, the source port SPORT and the destination port DPORT may not be changed and may be maintained to P_P and P_D2.

In some example embodiments, a configuration of the first IP packet PK1 (e.g., values of the source address SADDR, the destination address DADDR, the source port SPORT and the destination port DPORT) in the second electronic device D2 may be substantially the same as a configuration of the first IP packet PK1 in the first electronic device D1 (e.g., a configuration of the first IP packet PK1 after passing through the translator).

In a conventional communication system performing the NAT, the destination address DADDR and the destination port DPORT in the external network correspond to an address and a port of the first electronic device D1, the format of the source address SADDR and the destination address DADDR is translated from IPv6 to IPv4 after passing through the translator, and then the NAT is performed to translate the destination address DADDR and the destination port DPORT into an address and a port of the second electronic device D2. In contrast, in the communication system according to example embodiments, the destination address DADDR and the destination port DPORT may always correspond to an address and a port of the second electronic device D2 in all cases (e.g. without being translated by the first electronic device D1).

Figure 13:
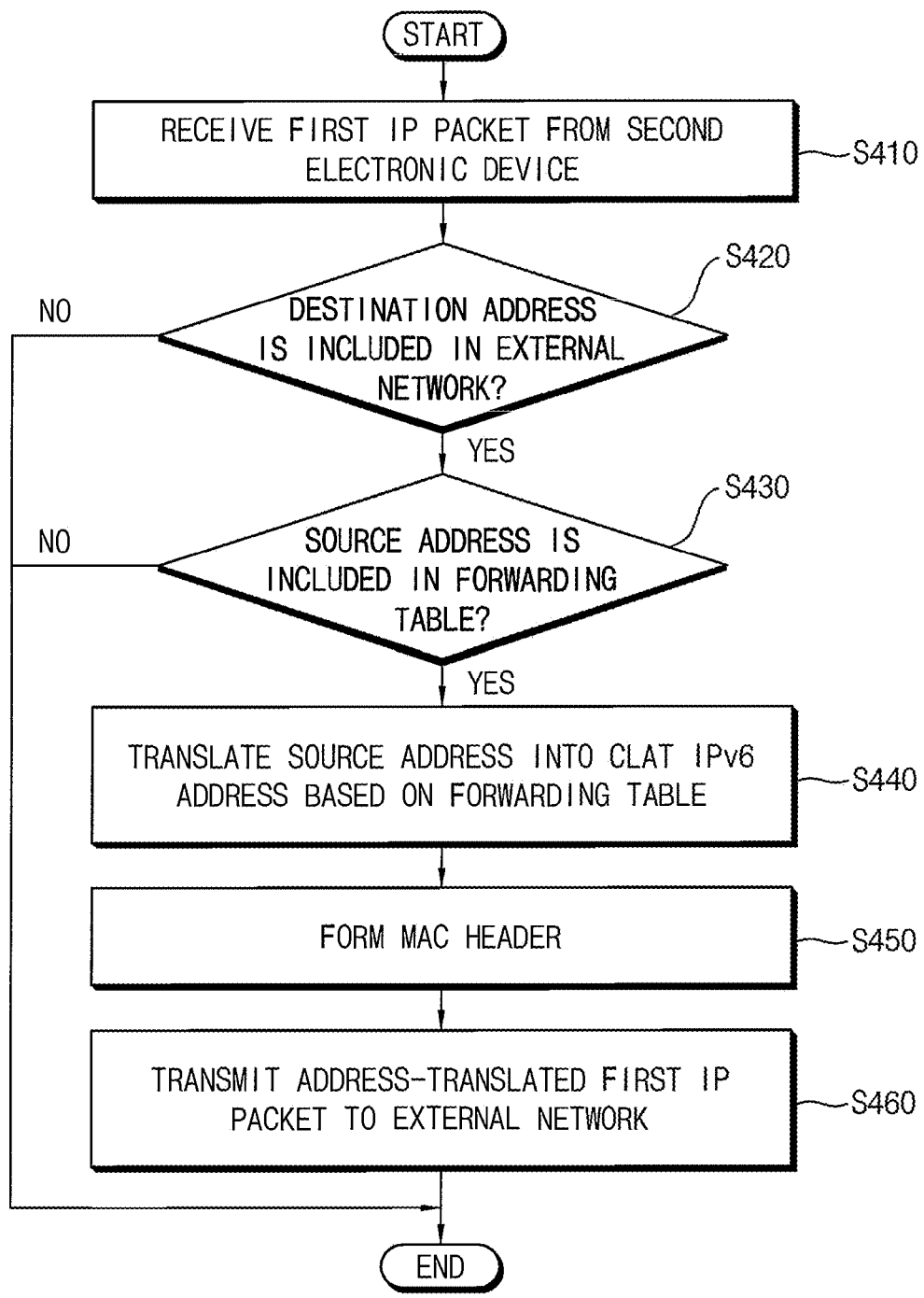
FIG. 13 is a flowchart illustrating another example of performing packet processing in FIG. 1.
Figure 14:
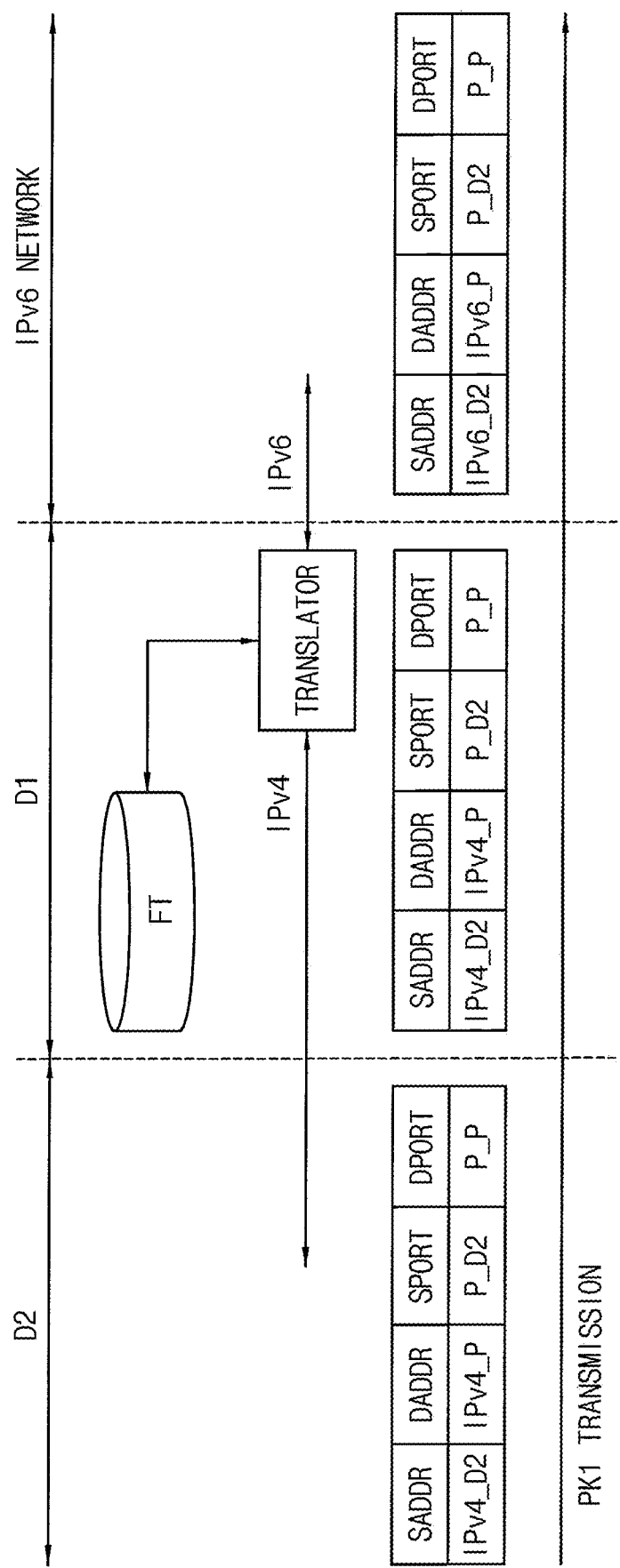
FIG. 14 is a diagram for describing an operation of FIG. 13.

FIG. 13 is a flowchart illustrating another example of performing packet processing in FIG. 1. FIG. 14 is a diagram for describing an operation of FIG. 13. FIG. 13 illustrates the second case in which the first IP packet is transmitted from the second electronic device to the external network through the internal network and the first electronic device.

Referring to FIGS. 1, 3, 7 and 13, when performing the packet processing (operation S300 in FIG. 1), the first IP packet PK1 including a source address, a destination address, a source port and a destination port may be received from the second electronic device 200 (operation S410). According to some example embodiments, operation S410 in FIG. 13 may be similar to operation S310 in FIG. 10.

It may be checked whether the destination address included in the first IP packet PK1 is an address included in (or belonging to, associated with, etc.) the external network 400 (operation S420).

When the destination address is included in the external network 400 (operation S420: YES), the forwarding table FT may be searched, and it may be checked whether the source address included in the first IP packet PK1 is an IPv4 address included in the forwarding table FT (e.g., the first IP address) (operation S430).

When the source address is the IPv4 address included in the forwarding table FT (operation S430: YES), this may represent that the first IP packet PK1 should be provided to the external network 400 by the tethering service, and thus the source address may be translated into a CLAT IPv6 address (e.g., the second IP address) based on the forwarding table FT (operation S440). For example, only an address translation for translating the source address may be performed once, and the destination address may also be translated together. In addition, since the NAT is not performed, the source port may not be translated and may be maintained.

A MAC header for the first IP packet PK1 may be formed or generated (operation S450). For example, the MAC header for the first IP packet PK1 may be formed based on the interface information of the external network 400 (e.g., a MAC address corresponding to an interface connected to IPv6). In some example embodiments, operation S450 may be omitted if there is no MAC header.

The address-translated first IP packet PK1' may be transmitted to the external network 400 (operation S460). According to some example embodiments, operation S460 in FIG. 13 may be similar to operation S360 in FIG. 10.

When the destination address is not included in the external network 400 (operation S420: NO), or when the source address is not the IPv4 address included in the forwarding table FT (operation S430: NO), the method of translating the IP packet according to example embodiments may be terminated.

In some example embodiments, in FIGS. 10, 11 and 13, operations S310 and S410 may be performed by the receiver 1110, operations S320, S330, S335, S340, S345, S420, S430 and S440 may be performed by the address translator 1130, operations S350 and S450 may be performed by the forwarding module 1150, and operations S360 and S460 may be performed by the forwarding module 1150, the transmission queue 1160 and/or the transmitter 1170.

Referring to FIG. 14, when the first IP packet PK1 is transmitted from a second electronic device D2 to an external network (e.g., an IPv6 network) through a first electronic device D1, changes in a source address SADDR, a destination address DADDR, a source port SPORT and a destination port DPORT included in the first IP packet PK1 are illustrated. The descriptions repeated with FIG. 12 will be omitted.

In the second electronic device D2, the source address SADDR and the destination address DADDR of the first IP packet PK1 may be IPv4_D2 and IPv4_P conforming to the IPv4 protocol. In the first electronic device D1, the source address SADDR and the destination address DADDR may be maintained as IPv4_D2 and IPv4_P, and a translator may translate the source address SADDR and the destination address DADDR of the first IP packet PK1 into IPv6_D2 and IPv6_P conforming to the IPv6 protocol to transmit the address-translated first IP packet to the external network. In all cases, the source port SPORT and the destination port DPORT may not be changed and may be maintained to P_D2 and P_P.

In some example embodiments, a configuration of the first IP packet PK1 in the second electronic device D2 may be substantially the same as a configuration of the first IP packet PK1 in the first electronic device D1 (e.g., a configuration of the first IP packet PK1 before passing through the translator). In the communication system according to example embodiments, the source address SADDR and the source port SPORT may always correspond to an address and a port of the second electronic device D2 in all cases (e.g. without being translated by the first electronic device D1).

Figure 15:
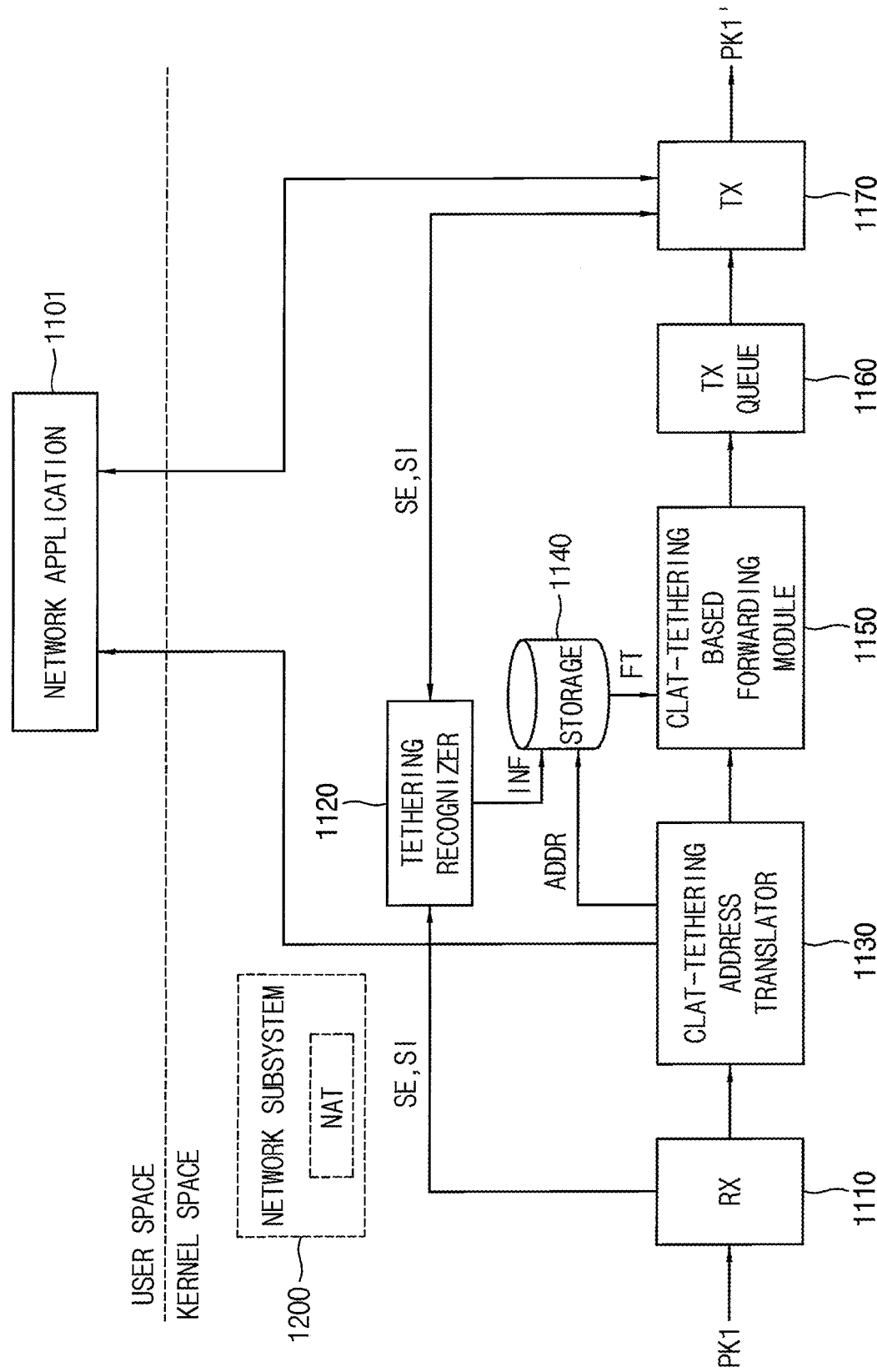
FIG. 15 is a block diagram illustrating another example of a translation device included in a first electronic device of FIG. 6.

FIG. 15 is a block diagram illustrating another example of a translation device included in a first electronic device of FIG. 6. The descriptions repeated with FIG. 7 will be omitted.

Referring to FIG. 15, a translation device of FIG. 15 may be substantially the same as the translation device of FIG. 7, except that the translation device of FIG. 15 further includes a network subsystem 1200.

The network subsystem 1200 may be implemented to perform a NAT, and may be generally included in a first electronic device (e.g., the first electronic device 1000 of FIG. 6). Since the NAT is not performed according to example embodiments, the network subsystem 1200 may be disabled or deactivated when the CLAT-tethering based forwarding or packet translation process or the NAT-less forwarding or packet translation process according to example embodiments is enabled, activated and/or performed. In FIG. 15, the disabled or deactivated network subsystem 1200 is illustrated by dashed lines.

As will be appreciated by those skilled in the art, the inventive concepts may be embodied as a system, method, computer program product, and/or a computer program product embodied in one or more computer readable medium(s) having computer readable program code embodied thereon. The computer readable program code may be provided to processing circuitry (e.g., a processor of a general purpose computer, special purpose computer, or other programmable data processing apparatus). The computer readable medium may be a computer readable storage medium. The computer readable storage medium may be any tangible medium that may contain or store a program for use by or in connection with an instruction execution system, apparatus, or device. For example, the computer readable medium may be a non-transitory computer readable medium.

Figure 16:
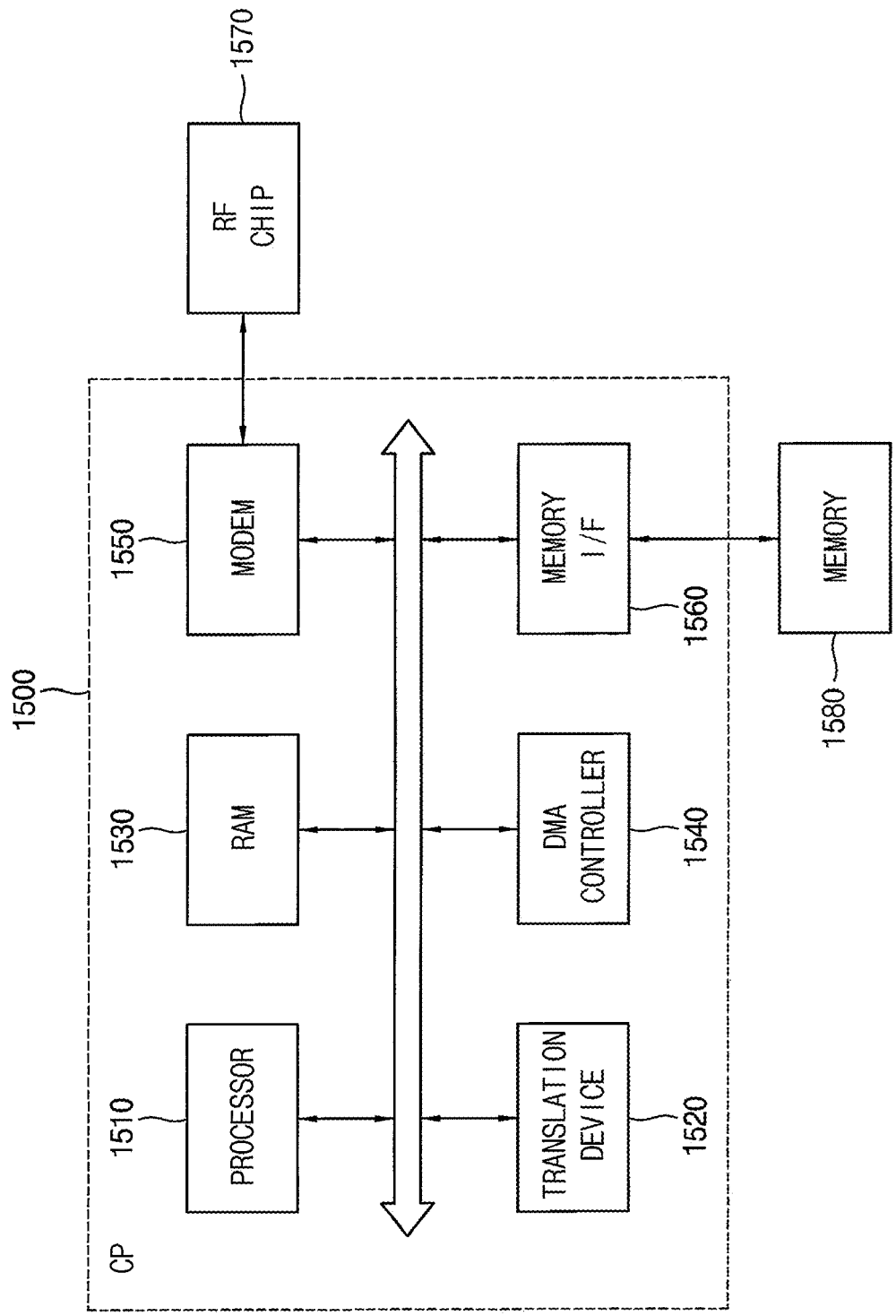
FIGS. 16 and 17 are block diagrams illustrating an example of a communication processor and an application processor included in a first electronic device of FIG. 6.
Figure 17:
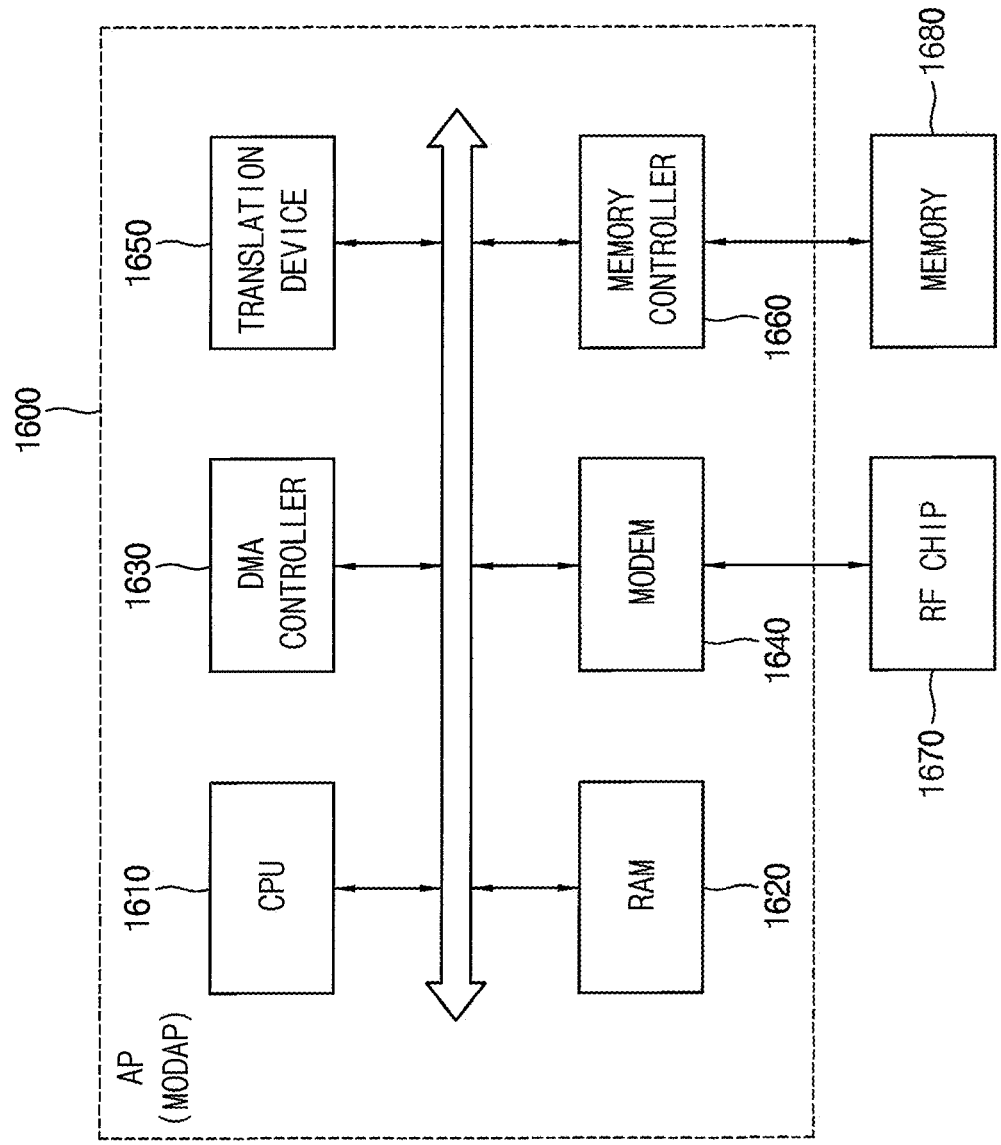

FIGS. 16 and 17 are block diagrams illustrating an example of a communication processor and an application processor included in a first electronic device of FIG. 6.

Referring to FIG. 16, a communication processor 1500 may include processing circuitry 1510 (e.g., at least one processor), a translation device 1520, a random access memory (RAM) 1530, a direct memory access (DMA) controller 1540, a modem 1550 and/or a memory interface 1560, etc., but example embodiments are not limited thereto.

The processing circuitry 1510 may control all operations of the communication processor 1500. The RAM 1530 may be used as an operating memory, a buffer memory, and/or a cache memory, etc. The DMA controller 1540 may support data transmission between the components of the communication processor 1500, and may control data to be directly transmitted between the components of the communication processor 1500 without interference by the processing circuitry 1510. The memory interface 1560 may transmit data to a memory 1580 and/or may read data from the memory 1580 via the control of the processing circuitry 1510 and/or the DMA controller 1540, but is not limited thereto. According to some example embodiments, the RAM 1530 and/or the memory 1580 may be the same as or included in the memory device 1040.

The modem 1550 may translate an IP packet into a signal suitable for transmission through a network and/or translate a signal received through the network into an IP packet. The modem 1550 may encode and modulate the IP packet and translate the IP packet into a transmission signal. Also, the modem 1550 may demodulate and decode a receiving signal received through the network and translate the receiving signal into the IP packet. The modem 1550 may amplify and filter a signal and communicate with an RF chip 1570 configured to convert a frequency of the signal. The RF chip 1570 may transmit the transmission signal to the network and/or receive the receiving signal from the network through an antenna. According to some example embodiments, operations described herein as being performed by the translation device 1520 and/or the modem 1550 may be performed by processing circuitry (e.g., the processing circuitry 1510).

The translation device 1520 may be substantially the same as the translation device 1030 in FIG. 6, and may perform the method of translating the IP packet according to example embodiments.

Referring to FIG. 17, an application processor 1600 may include processing circuitry 1610 (e.g., a central processing unit (CPU)), a RAM 1620, a DMA controller 1630, a modem 1640, a translation device 1650, and/or a memory controller 1660, etc. The application processor 1600 may be referred to as a ModAP because a function of a modem is integrated in the application processor 1600.

Operations of the processing circuitry 1610, the RAM 1620, the DMA controller 1630, the modem 1640, the translation device 1650, the memory controller 1660, the RF chip 1670 and/or the memory 1680 in FIG. 17 may be substantially the same as or similar to those of the processing circuitry 1510, the RAM 1530, the DMA controller 1540, the modem 1550, the translation device 1520, the memory interface 1560, the RF chip 1570 and the memory 1580 in FIG. 16, respectively. According to some example embodiments, the RAM 1620 and/or the memory 1680 may be the same as or included in the memory device 1040. According to some example embodiments, operations described herein as being performed by the translation device 1650 and/or the modem 1640 may be performed by processing circuitry (e.g., the processing circuitry 1610). According to some example embodiments, the modem 1640 may transmit and/or or receive a signal to and/or from the RF chip 1670 via the communication processor 1500.

The inventive concepts may be applied to various electronic devices and communication systems providing the tethering service. For example, the inventive concepts may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

Example embodiments may be described with reference to acts and symbolic representations of operations (e.g., in the form of flow charts, flow diagrams, data flow diagrams, structure diagrams, block diagrams, etc.) that may be implemented in conjunction with devices and/or systems discussed in more detail above. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, or in some cases be performed in reverse order.

The foregoing is illustrative of example embodiments and is not to be construed as limiting thereof. Although some example embodiments have been described, those skilled in the art will readily appreciate that many modifications are possible in example embodiments without materially departing from the novel teachings and advantages of example embodiments. Accordingly, all such modifications are intended to be included within the scope of some example embodiments as defined in the claims. Therefore, it is to be understood that the foregoing is illustrative of various example embodiments and is not to be construed as limited to the specific examples disclosed, and that modifications to some example embodiments are intended to be included within the scope of the appended claims.

What is claimed is:

1. A method of translating an Internet protocol (IP) packet, the method comprising:
    forming, by a first electronic device, a forwarding table by assigning a first IP address and a second IP address to a second electronic device, the first electronic device and the second electronic device being connected through an internal network such that a tethering service is provided to the second electronic device through the first electronic device, the first IP address and the second IP address having different formats, and the first IP address being associated with the second IP address in the forwarding table; and
    performing, by the first electronic device, an IP address translation on a first IP packet to obtain a translated first IP packet to be transmitted, the IP address translation being based on the forwarding table such that the translated first IP packet includes the first IP address or the second IP address, the first IP packet being included in a communication between the second electronic device and an external network through the internal network and the first electronic device, the first electronic device being a client of the external network, the first electronic device being a mobile device, a first port of the first IP packet being the same as a first port of the translated first IP packet, and both the first port of the first IP packet and the first port of the translated first IP packet being a destination port or a source port.

2. The method of claim 1, wherein
the first IP address has a first format based on an Internet protocol of a first version; and
the second IP address has a second format based on an Internet protocol of a second version different from the first version.

3. The method of claim 2, wherein
the internal network includes a communication environment based on the Internet protocol of the first version; and
the external network includes a communication environment based on the Internet protocol of the second version.

4. The method of claim 2, wherein the first IP address and the second IP address are inter-translatable with each other based on a client side translator (CLAT).

5. The method of claim 2, wherein
the Internet protocol of the first version is an Internet protocol version 4 (IPv4) protocol; and
the Internet protocol of the second version is an Internet protocol version 6 (IPv6) protocol.

6. The method of claim 1, wherein a network address translation (NAT) is not performed during the performing the IP address translation on the first IP packet.

7. The method of claim 1, wherein forming the forwarding table includes:
generating the first IP address to assign the first IP address to the second electronic device;
generating the second IP address to assign the second IP address to the second electronic device;
obtaining a medium access control (MAC) address of the second electronic device and interface information of the internal network; and
registering the first IP address, the second IP address, the MAC address and the interface information in the forwarding table.

8. The method of claim 7, wherein the registering registers the second IP address and the MAC address as a destination address.

9. The method of claim 1, further comprising:
performing packet processing including,
receiving the first IP packet from the external network, the first IP packet including a source address and a destination address,
checking whether the destination address is a format translatable IP address or a public IP address, the public IP address being a format untranslatable IP address,
checking whether the destination address is the second IP address included in the forwarding table based on the destination address being the format translatable IP address,
performing the IP address translation by translating the destination address of the first IP packet into the first IP address based on the destination address being the second IP address to obtain the translated first IP packet, and
transmitting the translated first IP packet to the second electronic device through the internal network.

10. The method of claim 9, wherein
the first IP packet further includes the source port and the destination port;
the destination address of the first IP packet is translated only once between the receiving the first IP packet and the transmitting the translated first IP packet; and
the first port of the first IP packet is the destination port of the first IP packet, and the first port of the translated first IP packet is the destination port of the translated first IP packet.

11. The method of claim 10, wherein the destination port included in the translated first IP packet transmitted to the second electronic device corresponds to a port of the second electronic device.

12. The method of claim 9, wherein the performing packet processing further includes:
forming a MAC header for the first IP packet based on a MAC address of the second electronic device and interface information of the internal network.

13. The method of claim 1, further comprising:
performing packet processing including,
receiving a first IP packet from the external network, the first IP packet including a source address and a destination address,
checking whether the destination address is a format translatable IP address or a public IP address, the public IP address being a format untranslatable IP address,
performing the IP address translation by translating a format of the destination address of the first IP packet based on the destination address being the format translatable IP address to obtain a format-translated destination address of the translated first IP packet,
checking whether the format-translated destination address is the first IP address included in the forwarding table, and
transmitting the translated first IP packet to the second electronic device through the internal network based on the format-translated destination address being the first IP address.

14. The method of claim 1, further comprising:
performing packet processing including,
receiving a first IP packet from the second electronic device, the first IP packet including a source address and a destination address,
checking whether the destination address is an address included in the external network,
checking whether the source address is the first IP address included in the forwarding table,
performing the IP translation on the first IP packet by translating the source address of the first IP packet into the second IP address based on the destination address being the address included in the external network and the source address being the first IP address to obtain the translated first IP packet, and
transmitting the translated first IP packet to the external network.

15. The method of claim 14, wherein the performing packet processing further includes:
forming a MAC header for the first IP packet based on interface information of the external network.

16. The method of claim 1, wherein the internal network is based on one of a universal serial bus (USB), Bluetooth or Wireless Fidelity (WiFi).

17. A communication system comprising:
a first electronic device configured to connect to an external server via an external network, the first electronic device being a client of the external server, and the first electronic device being a mobile device; and a second electronic device configured to receive a tethering service through the first electronic device via an internal network,
wherein the first electronic device is configured to,
 form a forwarding table by assigning a first IP address and a second IP address to the second electronic device, the first IP address and the second IP address having different formats, and the first IP address being associated with the second IP address in the forwarding table, and
 perform an IP address translation on a first IP packet to obtain a translated first IP packet to be transmitted, the IP address translation being based on the forwarding table such that the translated first IP packet includes the first IP address or the second IP address, the first IP packet being included in a communication between the second electronic device and the external network through the internal network and the first electronic device, a first port of the first IP packet being the same as a first port of the translated first IP packet, and both the first port of the first IP packet and the first port of the translated first IP packet being a destination port or a source port.

18. The communication system of claim 17, wherein the first electronic device includes:
 processing circuitry configured to,
  manage a tethering connection state with the second electronic device,
  obtain information associated with the second electronic device and the internal network,
  generate, assign and translate the first IP address and the second IP address of the second electronic device, and
  perform packet processing on the first IP packet based on the forwarding table to obtain a packet-processed first IP packet;
 a storage configured to store the forwarding table; and
 a transmission queue configured to queue the packet-processed first IP packet.

19. The communication system of claim 17, wherein a configuration of the first IP packet in the second electronic device is the same as a configuration of the first IP packet in the first electronic device when the second electronic device communicates with the external network through the internal network and the first electronic device.

20. An electronic device comprising:
 a receiver configured to receive a first Internet Protocol (IP) packet based on communication between an external electronic device and a first network using a tethering service, the first IP packet including a source address, a destination address, a source port and a destination port;
 processing circuitry configured to,
  manage a tethering connection state with the external electronic device such that a tethering service is provided to the external electronic device through a second network,
  obtain a medium access control (MAC) address of the external electronic device and interface information of the second network,
  generate a first IP address and a second IP address,
  assign the first IP address and the second IP address to the external electronic device,
  perform an IP address translation on the first IP packet using a forwarding table to obtain a translated first IP packet, the source address or the destination address of the first IP packet being modified to include the first IP address or the second IP address in the translated first IP packet, the first IP address and the second IP address having different formats, and
  the first IP address being associated with the second IP address in the forwarding table, and the forwarding table including,
   the first IP address, the second IP address and the MAC address of the external electronic device, and
   the interface information of the first network;
 a storage configured to store the forwarding table;
 a transmission queue configured to queue the translated first IP packet to obtain a queued first IP packet; and
 a transmitter configured to transmit the queued first IP packet,
wherein the source port and the destination port of the first IP packet are the same as a source port and a destination port of the queued first IP packet, and the electronic device is a mobile device.

* * * * *